US012647439B2

(12) United States Patent
Tholar et al.

(10) Patent No.: US 12,647,439 B2
(45) Date of Patent: Jun. 2, 2026

(54) SYSTEM AND METHOD FOR MACHINE LEARNING BASED ANOMALY DETECTION

(71) Applicant: Actimize Ltd., Ra'anana (IL)

(72) Inventors: Sunny Tholar, Pune (IN); Sumit Kumar, Pune (IN); Ori Snir, Hoboken, NJ (US)

(73) Assignee: Actimize Ltd. (IL)

( * ) Notice: Subject to any disclaimer, the term of this patent is extended or adjusted under 35 U.S.C. 154(b) by 91 days.

(21) Appl. No.: 18/371,568

(22) Filed: Sep. 22, 2023

(65) Prior Publication Data

US 2025/0106231 A1      Mar. 27, 2025

(51) Int. Cl.
*G06F 3/0482*      (2013.01)
*H04L 9/40*      (2022.01)
*H04L 41/16*      (2022.01)

(52) U.S. Cl.
CPC ........ *H04L 63/1425* (2013.01); *G06F 3/0482* (2013.01); *H04L 41/16* (2013.01); *H04L 63/1441* (2013.01)

(58) Field of Classification Search
CPC .... G06F 3/0482; G06F 3/0484; G06F 16/444; G06F 16/24578; G06F 16/9024; G06F 3/04842; H04L 63/20; H04L 41/145; H04L 63/1425; H04L 43/00; H04L 63/1416; H04L 63/06; H04L 63/1433; H04L 63/1441; H04L 41/16; G06V 10/225; G06N 20/00
See application file for complete search history.

(56) References Cited

U.S. PATENT DOCUMENTS

2017/0063912 A1* 3/2017 Muddu ................. G06F 3/0482
2022/0345477 A1* 10/2022 Criscione ........... H04L 63/1441

OTHER PUBLICATIONS

F. T. Liu, K. M. Ting and Z.-H. Zhou, "Isolation Forest," 2008 Eighth IEEE International Conference on Data Mining, Pisa, Italy, 2008, pp. 413-422, doi: 10.1109/ICDM.2008.17.
Huang, Z., "Extensions to the k-Means Algorithm for Clustering Large Data Sets with Categorical Values" (1998). Data Mining and Knowledge Discovery, 2(3), 283-304. doi:10.1023/a:1009769707641.
https://www.niceactimize.com/anti-money-laundering/suspicious-activity-monitoring/, printed on Sep. 21, 2023.
https://www.niceactimize.com/anti-money-laundering/actimizewatch-for-aml/, printed on Sep. 21, 2023.

* cited by examiner

*Primary Examiner* — Kyung H Shin

(57)      ABSTRACT
A computerized system and method may process and detect anomalies in input data using of machine learning models and techniques. A computerized system comprising one or more processors, a memory, and a communication interface to communicate via a communication network with remote computing devices, may be used for assembling a signal based on event data items; calculating an anomaly score for the signal, which may describe a change or difference between the signal and past signals; generating an alert based on the calculated score; presenting the alert on an output computer display; and allowing or reversing data transfers performed over a communication network between physically separate computer systems based on the anomaly score. Some embodiments of the invention may include performing peer anomaly detection context anomaly detection as two separate and distinct anomaly detection procedures, using separate and distinct machine learning models and algorithms.

17 Claims, 20 Drawing Sheets

| signal_type | active_flag | aggregation_type | signal_name | query_type | signal_logic |
|---|---|---|---|---|---|
| value | active | sum | cashtelloanin_value_monthly_sum_context | simple | sum(total transaction value within detection month) |
| value | active | stddev | eftout_value_monthly_stddev_context | simple | stddev(total transaction value within detection month) |
| volume | active | stddev | cashin_volume_monthly_stddev_context | simple | stddev(total transaction volume within detection month) |
| value | active | sum | chkcardout_value_monthly_sum_context | simple | sum(total transaction value within detection month) |
| value | active | max | iffloanin_value_monthly_max_context | simple | max(total transaction value within detection month) |
| volume | active | sum | cardout_volume_monthly_sum_context | simple | sum(total transaction volume within detection month) |
| value | active | max | iffhirin_value_monthly_max_context | simple | max(total transaction value within detection month) |
| value | active | stddev | cashtelloanout_value_monthly_stddev_context | simple | stddev(total transaction value within detection month) |
| value | active | stddev | eftin_value_monthly_stddev_context | simple | stddev(total transaction value within detection month) |
| value | active | stddev | iffhirin_value_monthly_stddev_context | simple | stddev(total transaction value within detection month) |
| value | active | max | atmhighout_value_monthly_max_context | simple | max(total transaction value within detection month) |
| value | active | stddev | loanin_value_monthly_stddev_context | simple | stddev(total transaction value within detection month) |
| value | active | stddev | eftloanout_value_monthly_stddev_context | simple | stddev(total transaction value within detection month) |
| value | active | stddev | cashtelout_value_monthly_stddev_context | simple | stddev(total transaction value within detection month) |
| volume | active | max | cashtelcardin_volume_monthly_max_context | simple | max(total transaction volume within detection month) |

| Peer Groups | Population Size(#) 410 | Population Size(%) 420 |
|---|---|---|
| Peer Group 0 | 3451524 | 24.34 |
| Peer Group 1 | 2139322 | 15.09 |
| Peer Group 2 | 1097993 | 7.74 |
| Peer Group 3 | 1605971 | 11.33 |
| Peer Group 4 | 515215 | 3.63 |
| Peer Group 5 | 1031002 | 7.27 |
| Peer Group 6 | 1531178 | 10.80 |
| Peer Group 7 | 564967 | 3.98 |
| Peer Group 8 | 1123333 | 7.92 |
| Peer Group 9 | 56066 | 0.40 |
| Peer Group 10 | 109551 | 0.77 |
| Peer Group 11 | 952894 | 6.72 |

FIG. 4

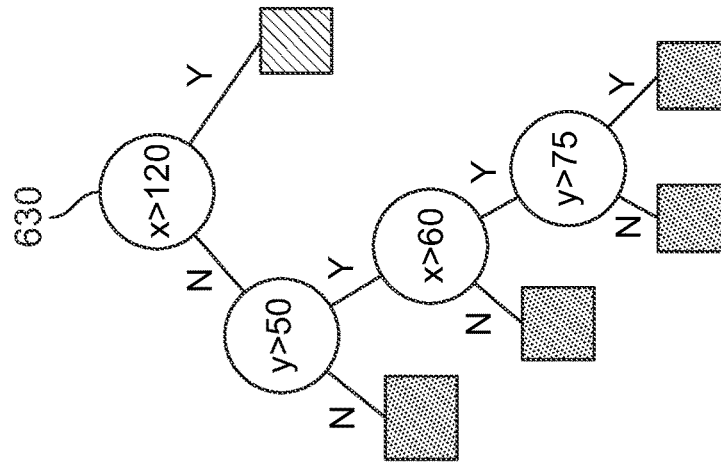

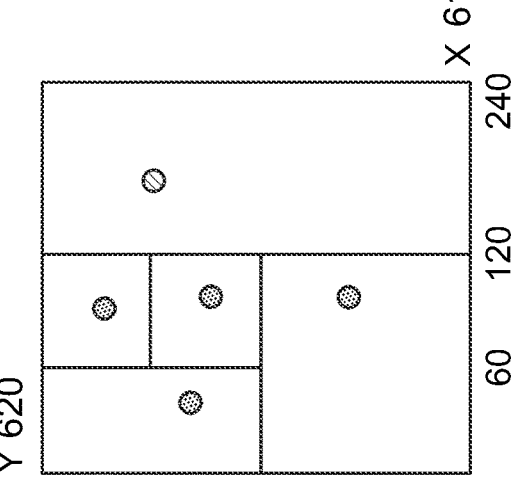

iForest Algorithm:

• Reduced Computational times as anomalies are identified early and quick

• Easily scalable to high dimensional and large datasets

*anomaly scores* : *By calling upon model IF.decision function() & provides the anomaly score for each sample within the dataset.*

*anomaly : By calling upon model IF.predict() and is used to identify if a point is an outlier (-1) or an inlier (1)*

FIG. 6

Peer Score Details    810    820    830    840

| Signal/Feature | Signal Value | Peer Median value | Contribution Strength |
|---|---|---|---|
| cashin#percentile_1_of_trx_qty | 3 | 47 | - - - |
| cashin#percentile_4_of_trx_sum | 186 | 3356 | +++ |
| cashin#percentile_96_of_trx_sum | 464 | 7967 | - - |
| cashin#sum_of_trx_sum | 500 | 9281 | ++ |
| cashin#active_days | 3 | 15 | ++ |
| cashin#sum_of_trx_qty | 15 | 90 | + |

FIG. 8

| | | | Filters |
|---|---|---|---|
| EFTOUT#PERCENTILE1_OF_TRX_SUM | 1st Percentile of "Fund Transfer Outgoing" over current month | Peer Group Profile Deviation | 25.0 | ++ |
| INTERNAL#SUM_OF_TRX_QTY | Total sum of "All Internal" over current month | Peer Group Profile Deviation | 200 | -- |
| CHKIN#SUM_OF_TRX_QTY | Total sum of "Check Incoming" over current month | Peer Group Profile Deviation | 300 | -- |
| INTERNAL#PERCENTILE1_OF_TRX_SUM | 1st Percentile of "All Internal" over current month | Peer Group Profile Deviation | 23 | - |

| Item Type<br>Party Activity Daily | Item ID<br>SAM1-1925 | Item Date<br>12/28/2012 12:00 AM | Party ID Number<br>SSN-99910000 | Party Name<br>User X | Party Key<br>99910000 | Score<br>100 |
|---|---|---|---|---|---|---|

Investigation

TRX Lookback

Party Card

Party Snapshots

DataIQ

Open Analytics

Open Analytics

Triggered Rule: Adv Anomaly Detection

Context Anomaly Signal Details

Columns     Filters

| Signal Name | Description | Base Logic | Signal Type | Signal Weight |
|---|---|---|---|---|
| "Outgoing Fund Transfers" Value Historical Profile Deviation | Detect "Outgoing Fund Transfers" value different from the account's historical behavior patterns over a specified period. | SUM (Transactions of Transaction Type Group = "EFT-OUT") over current month | Value | 1 |
| "Outgoing Fund Transfers" Volume Historical Profile Deviation | Detect "Outgoing Fund Transfers" value different from the account's historical behavior patterns over a specified period. | QTY (Transactions of Transaction Type Group = "EFT-OUT") over current month | Volume | 1 |

1316A

Peer Anomaly Signal Details

Columns

| Signal Name | Description | Base Logic | Signal Type | Signal Weight |
|---|---|---|---|---|
| "Check Teller Outgoing" Peer Group Profile Deviation | Detect "Check Teller Outgoing" value ratio peer profile deviation | SUM (Transactions of Transaction Type Group = CHKTEL-OUT) over current month | Value | 1 |
| "Fund Transfer Outgoing" Peer Group Profile Deviation | Detect "Fund Transfer Outgoing" value ratio peer profile deviation | SUM (Transactions of Transaction Type Group = EFT-OUT) over current month | Value | 1 |

▷ Filters

| | | | |
|---|---|---|---|
| "Fund Transfer Outgoing" Peer Group Profile Deviation | Detect "Fund Transfer Outgoing" value ratio peer profile deviation | QTY (Transactions of Transaction Type Group =EFT-OUT) over current month | Volume | 1 |
| "All Internal" Peer Group Profile Deviation | Detect "All Internal" value ratio peer profile deviation | QTY (Transactions of Transaction Type Group = INTERNAL) over current month | Volume | 1 |
| "Check Incoming" Peer Group Profile Deviation | Detect "Check Incoming" value ratio peer profile deviation | QTY (Transactions of Transaction Type Group = CHK-INN) over current month | Volume | 1 |
| "All Internal" Peer Group Profile Deviation | Detect "All Internal" value ratio peer profile deviation | QTY (Transactions of Transaction Type Group = INTERNAL) over current month | Volume | 1 |

Peer Group Details

This section should show details of how Peer groups were created, so users get guidence on what parameters were considered to build the peer group, thus making it easy to understand the type of entities the alerted party is being compared with.
Format of this section TBD

FIG. 13D (Cont.)

Step 1510: assemble a signal from event data items

Step 1520: calculate an anomaly score for the signal

Step 1530: generate an alert based on the calculated score

Step 1540: present the alert on an output computer display

SYSTEM AND METHOD FOR MACHINE LEARNING BASED ANOMALY DETECTION

FIELD OF THE INVENTION

The invention described herein relates to the field of automatic detection of anomalies in large volumes of data, and more particularly to machine learning based systems and methods for anomaly detection.

BACKGROUND OF THE INVENTION

The analysis of large volumes of data has become an essential aspect of modern industries and scientific research. Anomalies, also referred to as outliers or novelties, may be data points or patterns that deviate significantly from the expected norm or follow unexpected trends. Detecting anomalies is of paramount importance in various domains, such as cybersecurity, healthcare, industrial automation, finance, and environmental monitoring, as they may indicate potential issues, errors, fraudulent activities, or emerging trends that require immediate attention and/or indicate the need for appropriate risk management and planning. As datasets grow in size and complexity, the automatic identification and handling of anomalies within this data have emerged as critical challenges. There is thus a need for intelligent, anomaly detection systems and methods which may make use of complex computational techniques for considering complex patterns in high dimensional, large volumes of data.

SUMMARY OF THE INVENTION

A computerized system and method may process and detect anomalies in input data. A computerized system including one or more processors, a memory, and a communication interface to communicate via a communication network with remote computing devices, may be used for assembling a signal based on event data items; calculating an anomaly score for the signal, which may include or describe a comparison between the signal to past signals, and/or a change between the signal and past signals; generating an alert based on the calculated score; presenting the alert on an output computer display; and allowing or reversing data transfers performed over a communication network between physically separate computer systems based on the anomaly score.

Some embodiments of the invention may include organizing, using a first machine learning model or algorithm (which may be, e.g., an unsupervised machine learning model), a plurality of signals in decision trees, and calculate anomaly scores based on the decision trees or organization of signals in decision trees. Some embodiments may include clustering, for example by a second machine learning model or algorithm, a plurality of entities into groups based on entity data items or "static data" describing the entities, and then associating signals with one or more of the groups.

In some nonlimiting embodiments of the invention, event data and/or event types may describe or correspond to financial transaction data and/or classes or categories of financial transactions.

Some embodiments of the invention may include performing a peer anomaly detection procedure and a context anomaly detection procedure as two separate and distinct anomaly detection procedures, which may for example be executed in parallel, and, e.g., be consolidated to produce a single, final anomaly score—for example by normalizing anomaly scores provided using the two distinct procedures. In some embodiments, separate and distinct machine learning models and algorithms may be used for each distinct anomaly procedure.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 2 is an illustration of signal data according to some embodiments of the invention.

FIG. 4 shows an example output of a peer group formation process according to some embodiments of the invention.

FIG. 6 illustrates an example application of a machine learning anomaly detection algorithm according to some embodiments of the invention.

FIG. 8 shows an example database for storing peer anomaly scores according to some embodiments of the invention.

FIGS. 13A-D show an example visualization of anomaly detection results according to some embodiments of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

One example use case in which embodiments of the invention may be considered may be, e.g., that of a financial institution—where anomalies may be detected in event data such as for example financial transaction data. One skilled in the art would recognize, however, that while such example use case may be considered throughout the present document—different embodiments of the invention may be realized and used in diverse industries, such as for example by health management organizations where anomalies may be detected in patients' health records, laboratory tests, and the like (although many more examples from different technological and/or scientific fields may be considered). Furthermore, some embodiments of the invention may generally consider, relate to, or be applied to event data describing, e.g., data transfers over a communication network between a plurality of physically separate or remote computer systems. Similarly, while some example embodiments referred to herein may relate, e.g., to users operating computer systems and performing transactions using these systems, different example embodiments of the invention may relate to, e.g., remote computers taking part in data transfers over a communication network (e.g., in an automated manner, which may be free of human user intervention). Thus, particular use cases or example embodiments such as, e.g., ones related to finance or commerce should be considered as merely illustrative, non-limiting examples.

Figure 1:
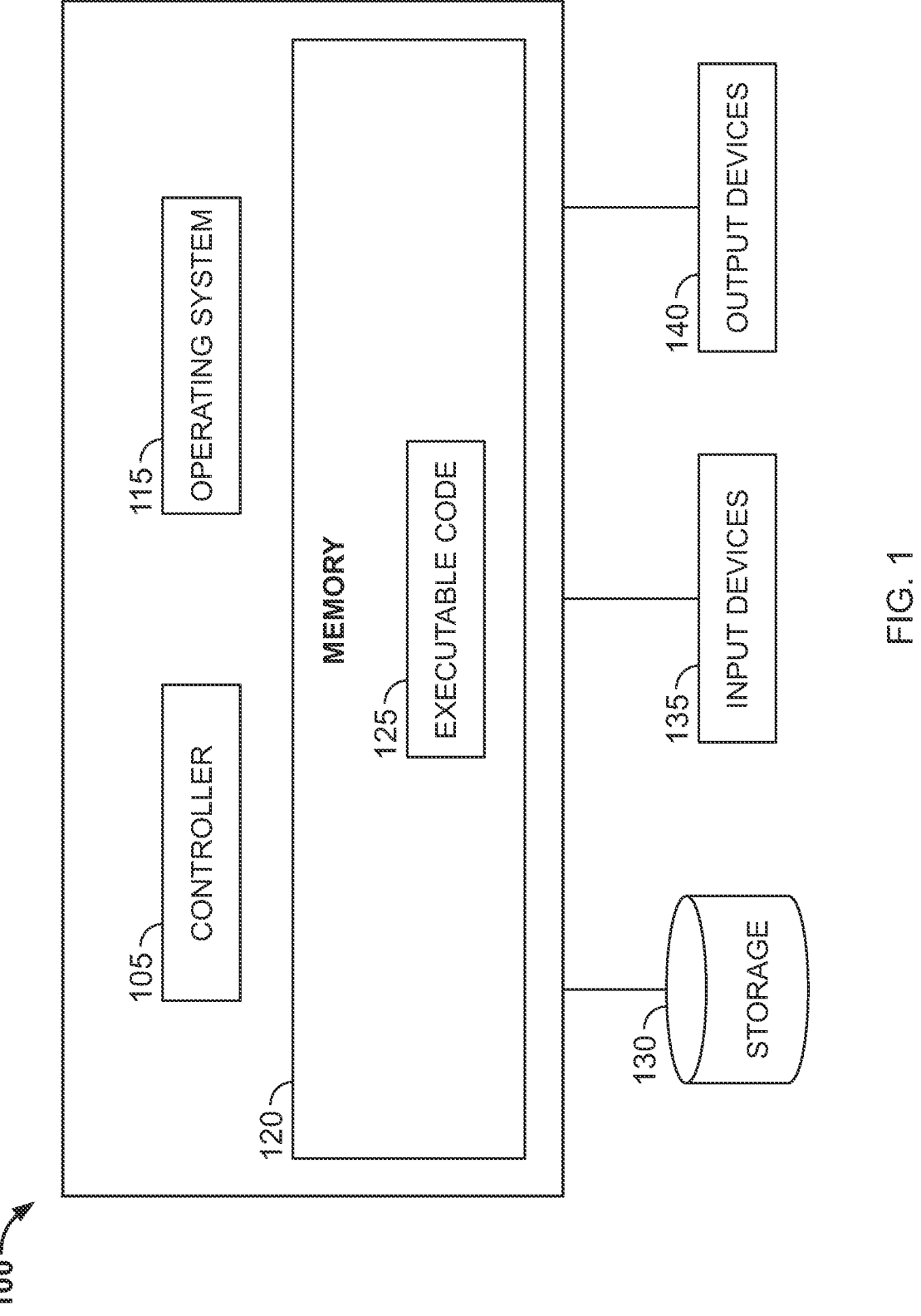
FIG. 1 is a high-level block diagram of an exemplary computing device which may be used with embodiments of the invention.

FIG. 1 shows a high-level block diagram of an exemplary computing device which may be used with embodiments of the invention. Computing device 100 may include a controller or processor 105 (or, in some embodiments, a plurality of processors) that may be, for example, a central processing unit processor (CPU), a chip or any suitable computing or computational device, an operating system 115, a memory 120, a storage 130, input devices 135 and output devices 140 such as a computer display or monitor displaying for example a computer desktop system. Each of the procedures and/or calculations discussed herein, and the modules and units discussed, such as for example those included in, or discussed with regard to FIGS. 2-15, may be or include, or may be executed by, a computing device such as included in FIG. 1, although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or a data store of a plurality of data items describing one or more remote computing devices as further disclosed herein.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIGS. 2-15 according to embodiments of the invention. In some embodiments, more than one computing device 100 or components of device 100 may be used for multiple functions described herein. For the various functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data describing one or more remote computing devices, as well as additional and/or different data items, may be stored in a storage 130 and may be loaded from storage 130 into a memory 120 where it may be processed by controller 105. In some embodiments, some of the components shown in FIG. 1 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out functions, methods and procedures as disclosed herein.

It should be noted that a plurality of physically separate computer systems and/or computational resources which may or may not correspond to the architecture of system 100 (and may include for example ones provided via cloud platforms and/or services) may be for example connected via a data or communication network as a multi-memory and/or processor system, which may be used in some embodiments of the invention. Those skilled in the art may recognize that a plurality of computer system architectures may be used in different embodiments of the invention.

Embodiments of the invention may be used for generating, assembling or creating advanced features which may for example describe event data and be used, e.g., as part of machine learning based protocols and procedures for detecting unusual patterns or anomalies, e.g., in large volumes of high dimensional data. Features assembled, generated, or created by embodiments of the invention may referred to as signals. Signals may be assembled based on a plurality of data or metadata items describing, for example, a plurality of events for which anomaly detection may be of interest (such as for example financial transactions having risk and/or being prone to fraud).

Data or metadata items describing or associated with events which may be considered as part of anomaly protocols and procedures outlined herein may be referred to as event data or event data items. In some embodiments of the invention, event data may be stored and/or included in computer memory 120 or storage 130. In other embodiments, event data may be stored and/or included in a third party database (such as for example a database found on a remote computer system or a could platform) which may be accessed and/or queried by embodiments of the invention using, e.g., network communication protocols as known in the art.

In some embodiments of the invention, event data and/or signals may be stored or provided, e.g., in CSV format— although one skilled in the art would recognize that various different data formats may be used, and that different types and sources of information and/or fields may be included, e.g., as part event data in different embodiments of the invention.

Embodiments may generate or assemble signals based on input data. In some embodiments a signal may be assembled or generated to have a plurality of components such as for example: (1) one or a plurality of event types or signal types or tags with which the signal may be associated; (2) a signal duration value describing, e.g., the length of a timeframe described by the signal; and (3) signal values or parameters describing, e.g., the content of the signal (which may be, e.g., a result of a plurality of logical and/or mathematical operations performed or executed by embodiments of the invention on the underlying data described by the signal). In some example embodiments, a signal may be assembled, e.g., by first associating an empty signal data item or database entry to a plurality of event types; then selecting, fetching or gathering a plurality of event data items based on the relevant event types (e.g., as may for example be reflected in queries and/or commands for data collection such as for example further demonstrated herein) and including the selected event data in the signal; and then determining or calculating the timeframe for the signal, or the timeframe described by the signal, for example as the range between the earliest date and/or time for an event data item included in the signal and that for the latest date and/or time for a data item in the signal. Additional or alternative procedures for assembling or creating signals may be used in different embodiments of the invention.

For instance, in some example embodiments relating to, e.g., detecting anomalies in event data describing, e.g., financial transactions—example event types may be strings or identifiers that may describe or identify a class of transactions, which may be, e.g., a class of financial transactions such as "cash withdrawal", "credit card payment", and/or transaction values such as, e.g., "over $1K", "under $30K" and the like. Example event durations or timeframes may be, e.g., one day, one week, one month, and so forth. Example signal values may be or may include, e.g., sums of values of transactions of a given type within a timeframe (such as, e.g., SUM($400, $600, $450, $650, $100, $100) for a one week long timeframe); a volume or number of transactions of a given type within a time frame (such as, e.g., SUM(2, 3, 1) for a one week long timeframe where 2, 3, and 1 transactions were performed in three respective days, which may be considered as time units within the timeframe); average values of transactions of a given type within a timeframe (such as, e.g., AVG($400. $600, $450, $650, $100, $100)); an average volume or number of transactions per time unit within a timeframe (such as, e.g., AVG(2, 3, 1)), and/or additional variables and/or parameters, which may be obtained using a variety of logical and/or mathematical operations performed on transaction event data, such as, e.g.: AVG(Volume(RATIO(Transaction_Type1 (SUM(Values))/Transaction_Type2(SUM(Values))), and the like. Some illustrative examples of signals and/or event data may be seen in, e.g., FIGS. 2, 5, and 8—see also discussion herein. One skilled in the art may recognize that additional or alternative signal types and/or durations and/or values or parameters may be used in different embodiments of the invention and may not at all be related to finance or commercial interactions.

A plurality of anomaly detection procedures and protocols may be used in different embodiments of the invention, e.g., to calculate or compute anomaly scores or ranks according to which the probability of an event data item or signal being anomalous may be quantified. Anomaly scores or ranks calculated by some embodiments of the invention may thus be, or may include or relate to comparing a given data point or signal to a plurality of past data points or signals (which may be, e.g., data points or signals describing and/or recorded or assembled based on events prior in time to the data point or signal considered for anomaly detection and/or used as an input to, e.g., anomaly detection protocols and procedures such as for example described herein), and/or describing a difference or change between the given data point or signal and the plurality of different past data points or signals, for example based on machine learning techniques as further described herein.

Embodiments of the invention may detect anomalies in signal data using "peer anomaly detection" protocols. For example, peer anomaly detection may include, in some embodiments, comparing "behavior", or event data, relating to an entity, with behaviors of other entities within a group for a given timeframe (such as for example a month), and detecting anomalous behavior relative to the group, which may involve, for example, weighting relevant behavioral data among relevant group members, e.g., as described herein. Groups of entities used for peer anomaly detection may also be referred to as "peer groups" herein.

Embodiments of the invention may detect anomalies in signal data using "context anomaly detection" protocols. For example, context anomaly detection may include, in some embodiments, comparing behavior for a given timeframe of a given entity, or of each entity, with its own historical behavior in past timeframes, and detecting anomalous behavior if current timeframe represents an outlier with respect to historical behavior.

Thus, for example, a peer anomaly score for a signal associated with entity X—which may be calculated in anomaly detection protocols such as for example discussed herein—may describe, in some embodiments, a plurality of past signals (e.g. signals prior in time to, or signals recorded prior to a given signal being examined for anomalies, or considered as input to an anomaly detection protocol or procedure) associated with a cluster or group of entities including entity X, or with a plurality of past signals associated with the members of such cluster or group. A context anomaly score for the same signal may accordingly describe, e.g., a plurality of past signals or event data associated with entity A only.

In some embodiments, a plurality of separate and distinct context and peer anomaly detection protocols may be executed for a plurality of entities—e.g., in parallel—and a weighted anomaly score or rank may be computed or calculated based on results from the two protocols for the entities, which may indicate if anomalies were detected, and may be used for generating an alert or notification as further described herein.

In some embodiments of the invention, protocols for anomaly detection may include a plurality of different steps or operations, such as for example: event and/or signal data creation or assembly; peer group formation; peer data formation; context data formation; peer anomaly detection; context anomaly detection; anomaly score normalization, weighting or consolidation; and final score and report generation. Different steps and/or operations, and/or different orders of execution of steps and/or operations may be used in different embodiments of the invention.

In some embodiments, event data or signal creation may include fetching, processing and/or storing input data (such as for example event data), e.g., on a regular basis such as for example once per a given timeframe length (e.g., once a day/week/month, etc.). In one non-limiting example, event data describing, e.g., financial transactions by a plurality of users, may be fetched from an event or transaction monitoring service or software—such as for example the Actimize Suspicious Activity Monitoring (SAM) software or platform—and may be stored or pushed into a database or data source, or an appropriate cloud based service such as for example the Amazon Web Services (AWS) based Athena service. One skilled in the art may recognize that various examples for data sources, data fetching and storage protocols and procedures may be used in different embodiments of the invention.

Embodiments may process event data based on, e.g., event types (such as for example financial transaction types) and their statistical values to create or assemble a signal based on input event data. Some embodiments may then use signals as data points and/or sources of information for anomaly detection as described herein. In some embodiments, querying or fetching of event data, and/or processing event data to create signals may be performed using various scripts and/or querying commands, e.g., using the Athena service, such as for example further demonstrated herein—although different protocols for data fetching and/or processing may be used in different embodiments.

FIG. 2 is an illustration of signal data according to some embodiments of the invention. In FIG. 2, each line among lines 210 may describe a signal among a plurality of signals, and each column among columns 220 may describe a feature or attribute of a signal. For example, as described herein, some signal types may include "value" or "volume". In addition, an "active flag" may describe, for example, if the signal should be considered or omitted from anomaly detection protocols and procedures (such as, e.g., ones further described herein)—which may for example be modified by a user in order to allow better control over the inputs for such protocols and procedures. An "aggregation type" may be assigned or be associated with a signal, e.g., to denote a statistic, mathematical operations, or information type described by the signal, such as for example "sum" or "standard deviation" (e.g., "stddev", for short) of underlying event data as implemented in signal logic as described herein. A "signal name" may generally be assigned to each signal to describe, e.g., event data included in the signal, such as for example "cash in volume monthly standard deviation context", and the like. A "query type" may describe the type of query used to create or establish the signal from underlying event data (such as, e.g., "simple", if the query contains only predefined Athena commands or operations). A "signal logic" feature or attribute may describe, e.g., the logical and/or mathematical operations used in processing event data—such as for example Sum (transactions) within a given timeframe such as, e.g., described herein. Additional or alternative features or attributes describing and/or included in signal data may be used in different embodiments of the invention.

As part of calculating anomaly scores as further demonstrated herein, some embodiments may weigh different event data items or signals (such as for example past event data or signals), e.g., based on various event types—such that, e.g., not all signals and/or event types may have similar effect in detecting anomalies using anomaly detection procedures. Some embodiments may weigh, or assign weights to, a plurality of signals based on historical or past alert or notification data. For example, in case one or more positive alerts were generated for one or more signals, or for signal or event types with which a signal may be associated (such as for example a transaction of a "cash withdrawal" type), some embodiments may assign higher weights to the signal, for example, according to Eq. 1:

$$\text{Weight for the signal} = \frac{\text{Total number of positive alerts}}{\text{Total number of alerts}} \quad \text{(Eq. 1)}$$

where true or "positive alerts" may be alerts or notifications later labeled or confirmed (e.g., by a human user) to correctly indicate an event of significance (such as for example an actual credit card fraud in cash withdrawal), and the total number of alerts may include alerts which may not correspond to any events of significance, or may have not been labeled as "positive". Different weighing schemes and/or procedures may be used in different embodiments of the invention.

Signals and their weights may be assembled or created, and stored, e.g., in CSV format—although other file formats may be used in different embodiments.

Some embodiments may fetch or retrieve entity data (which may be referred to as "static" data herein, or as data not considered as variable for which anomalies may be detected) which may be used, e.g., for forming a plurality of peer groups. In some example embodiments, entity profile data—which may, in one nonlimiting example, be describe bank or credit card account profiles—may be fetched from an appropriate data source or database which may for example be included in the Athena service alongside event and/or signal data, and may include static data such as, e.g.:

account_key
    party_key
    entity_sk
    occupation_cd
    party_type_cd
    client_net_worth
    party_curr_annual_income
    client_sophistication_cd account_classification_cd
acct_curr_st_total_net_worth which may represent characteristics of an entity and be used for distinguishing it from other entities with respect to its behavior as, e.g., described by event data. Different characteristics, however, may be used in different embodiments.

Event or entity behavior (e.g., of financial transactions, as may be reflected in event data such as transaction data or records) can vary from one peer group to another (such as for example from individuals to cooperations). Thus, in some embodiments, it may be desirable to have separate machine learning models used for detecting anomalies in different peer groups.

Some embodiments of the invention may form or cluster a plurality of peer groups, e.g., by running an unsupervised machine learning based model on the static data or attributes such as for example described herein. Using machine learning based clustering protocols and procedures, embodiments may cluster entities into separate groups according to or based on their attributes or behavior. In some embodiments, the K-Mode clustering algorithm may be used for forming peer groups from static data, although different procedures, protocols, and/or algorithms may be used in different embodiments.

In some embodiments, clustering operations and procedures (including or involving, for example, the K-Mode algorithm) may include calculating or measuring similarity, using, for example eq. 2:

$$d(X, Y) = \sum_{j=1}^{m} \delta(x_j, y_j) \tag{Eq. 2}$$

$$\delta(x_j, y_j) = \begin{cases} 0, & x_j = y_j \\ 1, & x_j \neq y_j \end{cases}$$

where d(X, Y) is the calculated similarity score for entities X and Y, and $x_j$, $y_j$ are inputs for similarity calculation and/or clustering operations, such as for example entity profile attributes, data, or static data including, e.g., entity or account type, account_key, party_key, and the like, as described herein. Some embodiments may thus measure or calculate similarity based on entity profile attributes or entity data, and based on whether a plurality of profile attributes match for a the entities considered. For example, in some embodiments, if X and Y share more than a threshold value or number of entity profile attributes (such as for example a threshold number of T=2; while, e.g., X and Y have matching 'party_type_cd' and 'account_classification_cd' 'client-_sophistication_cd' entries or values, namely 3 matching attributes)—then X and Y may be clustered or grouped into a single peer group. Additional or alternative similarity formulas and/or scores may be used in different embodiments of the invention.

Figure 3:
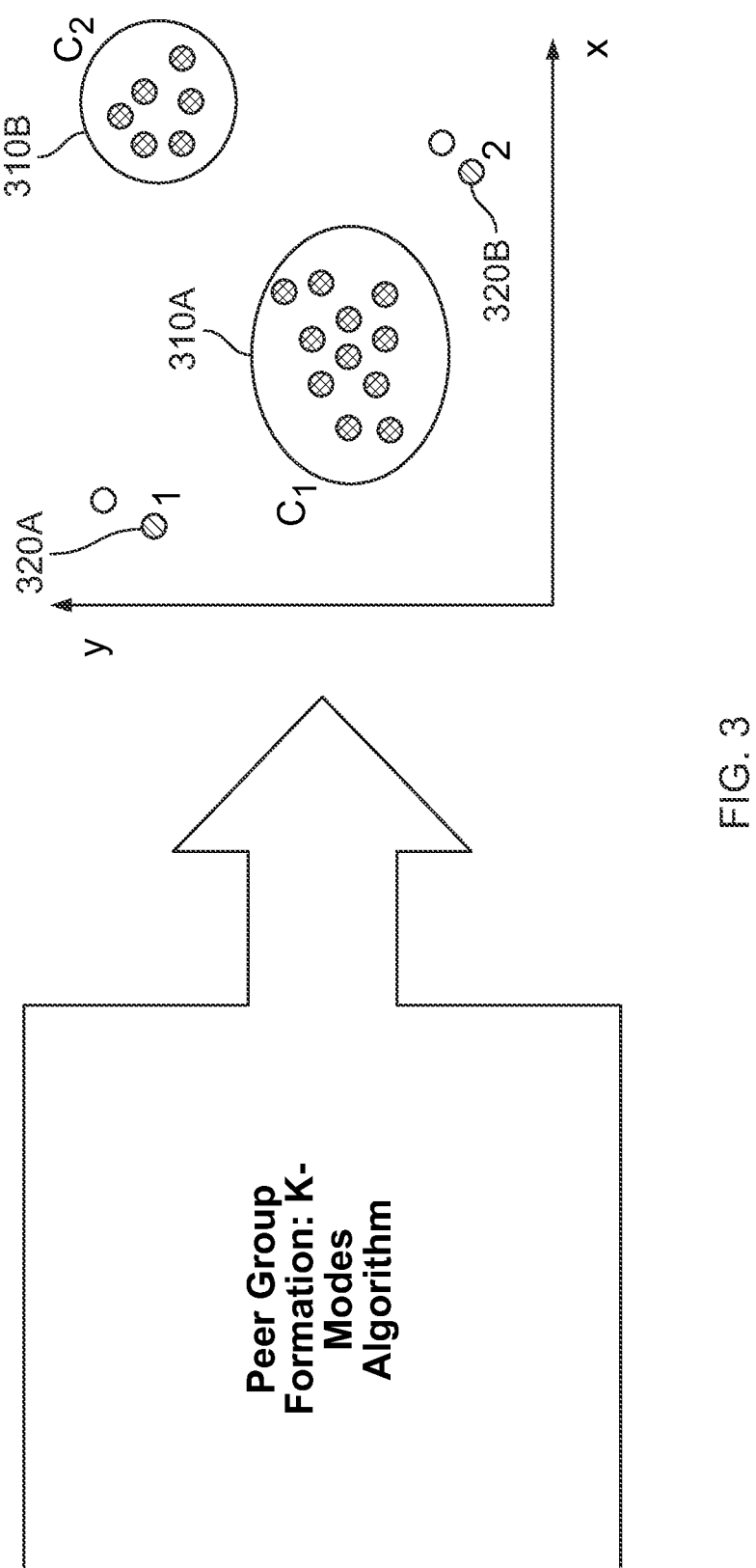
FIG. 3 illustrates example results of a peer group formation process according to some embodiments of the invention.

FIG. 3 illustrates example results of a peer group formation process according to some embodiments of the invention. Two peer groups 310A and 310B may be formed from a plurality of entities—for example using the K-Mode algorithm and/or based on, e.g., similarity calculations and attributes or features x and y—which may, e.g., be included in static data such as for example described herein. Two data points 320A and 320B were not clustered with any of groups 310A and 310B and may therefore be considered outliers (as such, outlier entities may not be subject to, e.g., peer anomaly detection protocols such as described herein with reference to some embodiments of the invention). The received peer groups may be used in anomaly detection protocols and procedures such as, e.g., further described herein.

In some embodiments of the invention, a peer group formation protocol or procedure, incorporating an appropriate machine learning model or a plurality of models, may include, e.g.:

Specifying (e.g., manually, by a human user) a target number of peer clusters or groups which may be received as output.

Randomly selecting data points as initial cluster centers. Such initial centers may represent common attributes or categories that may "attract" similar data points (which may be or may represent, e.g., entities considered in peer group formation and found similar according to Eq. 2), or with which such similar data points may be clustered.

Calculating a similarity or distance score between data points and cluster centers, and assigning data points to a cluster whose center is most similar to it, e.g., according to Eq. 2. Different similarity or distance scores, however, may be used in different embodiments of the invention and, e.g., include relationships between different attributes (such as for example included in static data as described herein) of the data points considered.

Updating the cluster centers, e.g., based on statistics of attributes of the data points (such as for example setting the most frequent, or maximal, or average value of an attribute or category associated with the data points within each cluster, following a clustering operation, as the new cluster centers).

Iteratively repeating the calculating of similarity scores, the assigning of data points to clusters, and the updating or adjusting of cluster centers—e.g., until a final arrangement of clusters is found (e.g., upon convergence of the clustering procedure and corresponding groups or clusters along a predefined number, e.g., i=5, of subsequent clustering iterations).

It should be noted that additional or alternative operations, and/or different orderings of clustering related operations, may be included in different embodiments of the invention.

FIG. 4 shows an example output of a peer group formation process according to some embodiments of the invention. It may be seen that a plurality of peer groups (which may be provided, e.g., upon convergence of a K-Mode algorithm executed on static data describing a plurality of entities such as for example described herein) may be of different population sizes, as may be shown in terms of both absolute population size 410 and the percentage 420 of a given population size from the total number of entities considered as part of the relevant peer group formation process. In some embodiments, peer groups may be assigned a number or identifier (such as for example peer group X, where X=0, 1 . . . X) and be used in anomaly detection protocols and procedures such as, e.g., further described herein.

Embodiments of the invention may form or gather peer data (for example, after peer groups may be formed, such as, e.g., described herein) using appropriate queries and/or commands. In some embodiments, event and/or signal data such as for example discussed with reference to FIG. 2 may be associated with relevant entities (such as for example a band account used for payment in relevant financial transactions) Some embodiments may make reference to a plurality of signals or event data items or files and take, query or collect all the event or signal data items which may be applicable for, or associated with, a peer. The query may be executed on, e.g., all the entities and signals to get the final data or output. A non-limiting, example query or command including entity references that may be used in some embodiments of the invention may be, e.g.:

Example Query 1: select p.party_key as entity_key, p.entity_sk as entity_sk, 'party' as entity_type_cd, case when ds.day is null then date_format($$nullday, 'yyyy-mm') else date_format(ds.day, 'yyyy-mm') end as signal_detection_month, case when sum(trx_sum) is null then 0 else sum(trx_sum) end as signal_value from xdt_cds_v_inc_party as p join xdt_cds_v_inc_party_account_relation as pa on pa.party_sk=p.entity_sk left join xdt_sam_prf_tg_v_xdt_sam_agg_pgr_day_summary as ds on pa.party_sk=ds.party_sk and month (ds.day)=$$month and year(ds.day)=$$year and ds.transaction_type_cd='cashtelloanin' where p.is_active < > 0 group by p.party_key, p.entity_sk, ds.party_sk, ds.day Additional or alternative queries or commands may be used in different embodiments.

Embodiments of the invention may form or gather context data by appropriate queries or commands. For example, embodiments may query a plurality of event or signal data items or files and gather all signal which may be included in a "context" (which may be for example a set of transactions above a threshold sum T=$1,000 and performed within a month) for a given entity. An example, nonlimiting query or command that may be executed on relevant entities and signals to get context data may be, e.g.:

Example Query 2: select p.party_key as entity_key, p.entity_sk as entity_sk, 'party' as entity_type_cd, case when ds.day is null then date_format($$nullday, 'yyyy-mm') else date_format(ds.day, 'yyyy-mm') end as signal_detection_month, case when sum(trx_qty) is null then 0 else sum(trx_qty) end as signal_value from xdt_cds_v_inc_party as p join xdt_cds_v_inc_party_account_relation as pa on pa.party_sk=p.entity_sk left join xdt_sam_prf_tg_v_xdt_sam_agg_pgr_day_summary as ds on pa.party_sk=ds.party_sk and month (ds.day)=$$month and year (ds.day)=$$year and ds.transaction_type_cd='cardout' where p.is_active < > 0 group by p.party_key, p.entity_sk, ds.party_sk, ds.day One skilled in the art would recognize that additional or alternative queries or commands may be used in different embodiments of the invention.

Figure 5:
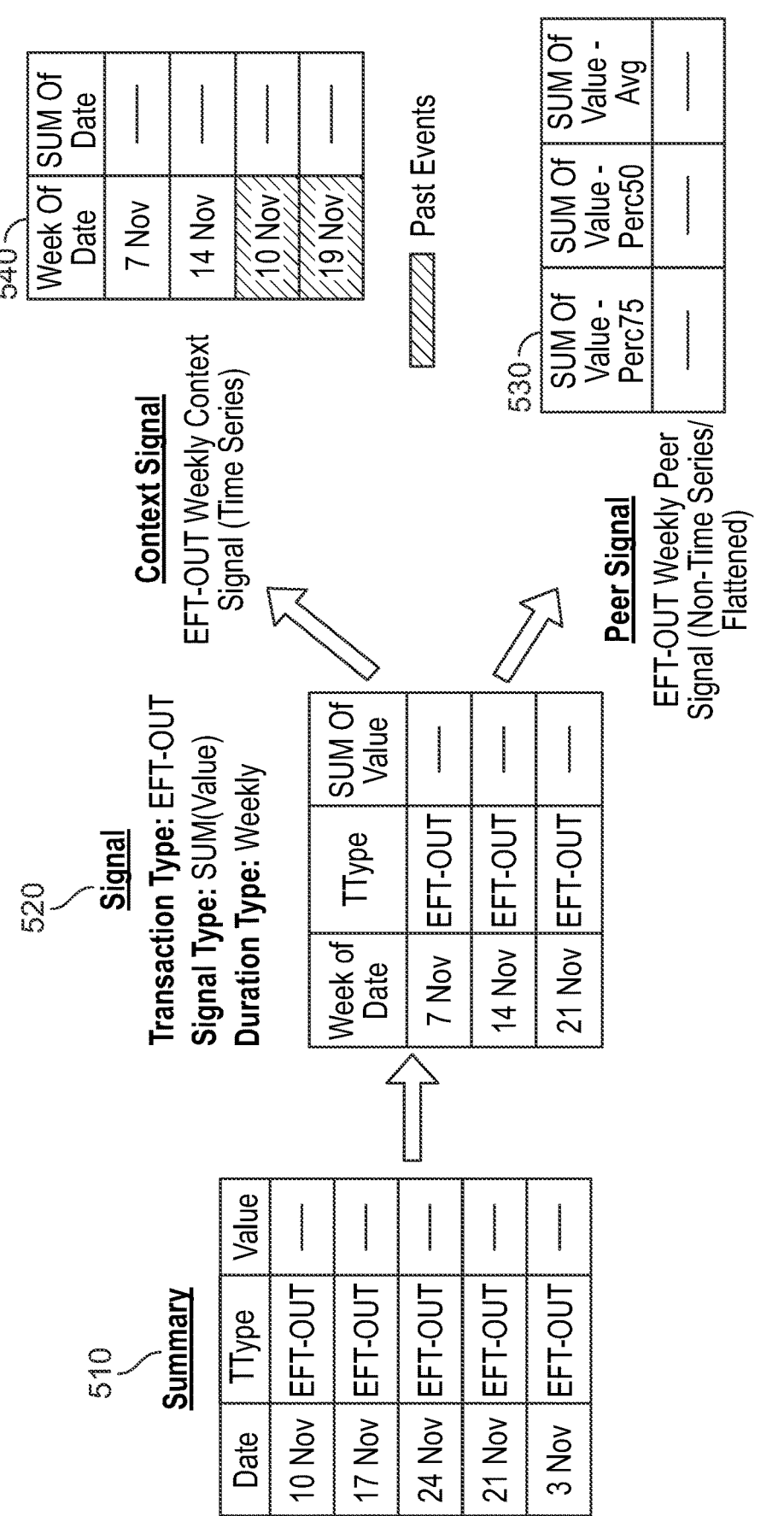
FIG. 5 illustrates an example signal creation process according to some embodiments of the invention.
Figure 7:
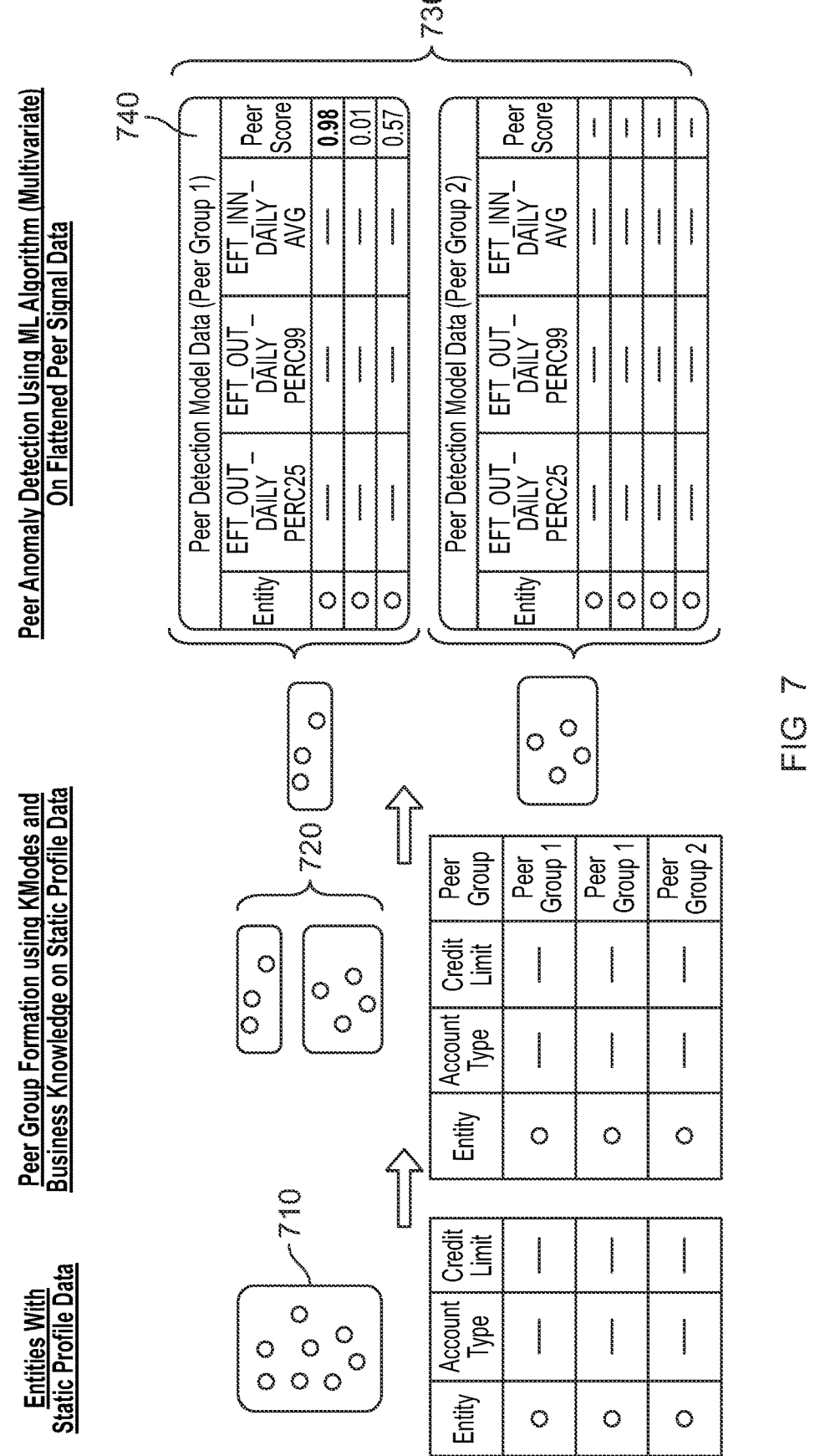
FIG. 7 shows an example peer group formation process and an example output of a peer anomaly detection protocol according to some embodiments of the invention.

FIG. 5 illustrates an example signal creation process according to some embodiments of the invention. Event data or summary data 510 may describe or include dates and values for a plurality of operations or transactions of a given type (which may be, for example, a "Transaction Type" or "TType" such as, e.g., an outgoing electronic funds transfer, or EFT-OUT). Embodiments may gather or query event data and perform appropriate signal logic operations (such as for example sum event or transaction values) to, e.g., form or assemble signal 520 describing event data for a given timeframe (such as for example EFT-OUT events or transactions taking place within the week of November 7$^{th}$), e.g., according to the various protocols described herein. Event data and/or signals may be further processed to include, e.g., results of additional signal logic operations such as percentages, percentiles, or average values for a given timeframe as attributes or features (such as, e.g., "SUM Of Value_PERC75", "SUM Of Value_PERC50", and the like, as shown in FIG. 7 for peer signal 730). The resulting signal may be assigned various attributes, such as, e.g., a signal type—which may be for example result in a peer signal 530 or in a context signal 540) and/or include or inherit various attributes of the underlying event data items. In some embodiments, context signals and peer signals may describe timeframes of different lengths. For example, context signals may include, e.g., historical event data for 12 months, and peer signals may include event data for a single month. Different timeframe lengths may be used in different embodiments of the invention.

Machine learning protocols and techniques—which may be or may include for example unsupervised machine learning models as described herein—may be used in some embodiments of the invention may analyze features or attributes of peer data (such as for example event data or signals describing members of peer groups) and determine their normal behavior among peers. Such protocols and techniques may be trained on historical data (such as, e.g., context or peer signals) to establish a baseline of what is considered "normal behavior". Once the model has learned the normal behavior, it may compare new, previously unseen or unconsidered data points (such as, e.g., signals) to this baseline. If a data point deviates significantly from the learned normal behavioral pattern, it may be classified as an anomaly or outlier. The model may provide or calculate a score, rank, or label to indicate a degree of abnormality for each data point, which may be or may indicate, for example a difference or change between a signal and past signals-allowing. e.g., for further investigation or for taking an automated action based on the severity of the anomaly detected.

Using input data such as peer event and/or signal data, embodiments of the invention may run an appropriate, unsupervised machine learning model and/or algorithm, such as for example the Isolation Forest (iForest) algorithm, to calculate or compute an anomaly score or rank for each data point associated with a given peer. Machine learning models and/or algorithms used for providing anomaly scores may, in some embodiments, automatically organize or sort a plurality of signals in a decision tree, and calculate or compute scores based on the tree or organization in the tree—see further discussion herein considering the non-limiting example of the iForest algorithm. Scores output by the algorithm may subsequently be stored, e.g., in memory 120 for further use, and anomalous or outlier points may be collected or isolated from the input set of points based on the scores. For example, threshold values and corresponding conditions or criteria may be used for determining anomality, such as, e.g., 'if a score for a given point is below 0—then the point may be determined as an outlier; otherwise, it may be determined as non-anomalous, or normal. As another example, a second machine learning model and/or protocol or operation may be applied to anomaly scores—such that anomality is predicted based on the score, given that, e.g., the appropriate model was trained on historical anomalies to predict anomalies from input scores. Additional or alternative anomaly detection algorithms, and/or conditions or criteria for determining whether a given data point is anomalous, may be used in different embodiments of the invention.

FIG. 6 illustrates an example application of a machine learning anomaly detection algorithm according to some embodiments of the invention. As discussed herein, it can be seen that a machine learning model and algorithm such as for example the iForest algorithm may provide or assign anomaly scores or ranks for each data point or sample within the input dataset, using binary decision trees. In some embodiments of the invention, the iForest algorithm may be used for splitting input data (such as for example event or signal data) using lines randomly selecting an attribute—such as for example signal values as described herein, or any attribute x 610 or y 620—and then randomly selecting a split value between the minimum and maximum values allowed for that attribute (e.g., at x=120). Recursive splitting or partitioning (e.g., at y=50, x=60, y=75) may be represented by a tree structure often referred to as the Isolation Tree 630, while the number of partitions required to isolate a point may be referred to as the length of the path, within the tree, to reach a terminating node in the tree starting from its root. In some embodiments, the iForest model (or, e.g., a separate, second machine learning model) may use or call another function or operation to predict if a point is an outlier (if so, the algorithm may assign the point with a corresponding decision value or score of, e.g., '−1') or an 'inlier' (and e.g. assign a corresponding decision value or score of '1')—for example based on its corresponding path in Isolation Tree 630. Different implementations of the iForest algorithm are known in the art and may be used in different embodiments of the invention. Additional or alternative operations and/or techniques may be included in anomaly detection machine learning algorithms and/or procedures used in different embodiments of the invention.

FIG. 7 shows an example peer group formation process and an example output of a peer anomaly detection protocol according to some embodiments of the invention. It can be seen that a plurality of entities 710 (which may be or may describe, e.g., remote computers taking part in data transfers over the network, or individual users which may be operating computer systems and may be taking part in financial transactions) described by or associated with static profile data or entity data items (such as, e.g., "account type" and "credit limit") may be received as input, and, e.g., be grouped or clustered into peer groups 720 based on the entity data items by embodiments of the invention (such as for example using the K-Modes machine learning algorithm as described herein). Each entity may then be attributed or associated with the peer group to which it has been clustered (e.g., "peer group 1" or "peer group 2"). Event data relevant to or associated with, e.g., each peer within a given group may be gathered by embodiments of the invention using appropriate queries or commands to form or assemble a plurality of corresponding peer signals 730 such as for example described herein, which may include, e.g., results of signal logic operations such as percentages, percentiles, or average values for a given timeframe (such as, e.g., "EFT_OUT_DAILY_PERC25", "EFT_OUT_DAILY-_PERC25", and the like) as attributes or features. Such signals may then be associated with the relevant peer group by embodiments of the invention, for example using an appropriate identifier, label or tag as part of the signal data or relevant database entry. Machine learning based anomaly detection algorithms, such as for example the iForest algorithm, may be used to calculate, provide, or assign peer anomaly scores 740 to each of the signals or peers considered, and scores may be used for predicting anomalies of input signals or datapoints such as for example described herein.

FIG. 8 shows an example database for storing peer anomaly scores according to some embodiments of the invention. An example database in table format such as, e.g., displayed in FIG. 8 may include, a plurality of signal or feature identifier or name entries 810, a peer score value 820, statistical information describing additional signals of the same or related types, such as e.g., 'peer median value' 830—which may be for example a median value of score calculated for signals of the same type (e.g., particularly describing a "cash in" transaction) for the same peer group, and a contribution strength 840, which may indicate the sign and magnitude or impact of the signal considered on the statistical information or parameter considered (which may be, e.g., negative and large for a score of '3' in a peer group described by a peer median value is '47'; such impact may be denoted, e.g., using 3 minus signs or '−−−'). Different database formats and/or statistical parameters and/or entries may be considered and/or calculated in different embodiments of the invention.

Embodiments of the invention may perform or execute context anomaly detection protocols or procedures, which may include comparing event data of a given entity to its own historical event data or behavior in similar events (e.g., as characterized by a single or matching event or transaction type). In some embodiments, 12 months of event data may be used for context anomaly detection, although alternative timeframes and/or amounts of input data may be used. In some embodiments, a machine learning anomaly detection algorithm and/or protocol (such as for example the iForest algorithm discussed herein) may be executed on input context data—such as for example input event data describing a timeframe of events of a given type performed by a single entity—and calculate or provide an anomaly score the entity considered. Embodiments may execute such a context anomaly detection algorithm or procedure on a plurality of entities, and a context anomaly score may be stored (e.g., in memory 120) for each of the entities.

Figure 9:
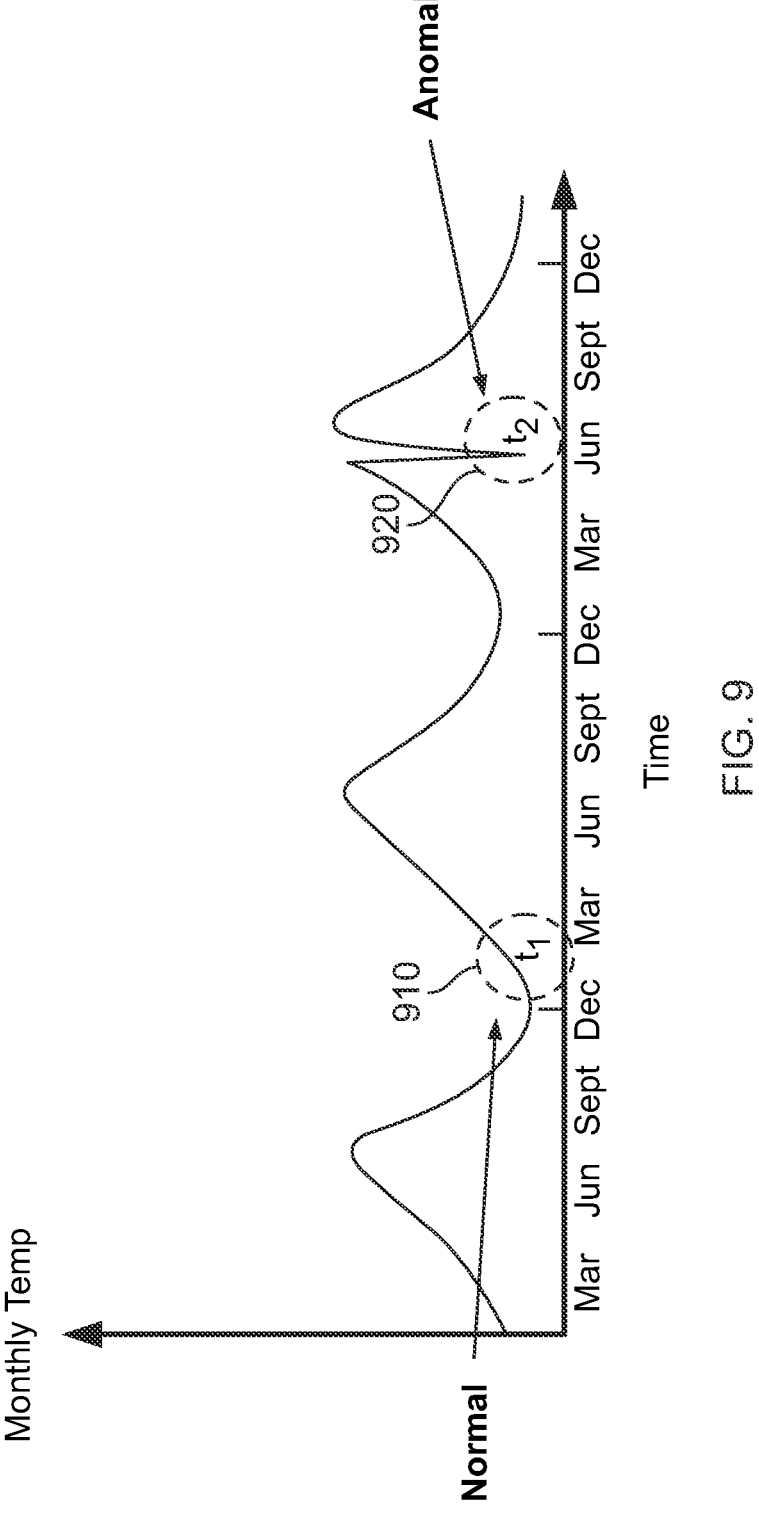
FIG. 9 illustrates an example result of a context anomaly detection procedure according to some embodiments of the invention.

FIG. 9 illustrates an example result of a context anomaly detection procedure according to some embodiments of the invention. In some embodiments, a machine learning anomaly detection algorithm and/or protocol (such as for example the iForest algorithm) may be applied, e.g., to monthly temperature data measured over ~3 years. While fluctuations in temperature may result in local minima (such as for example around the month of December, or in $t_1$ 910), anomaly detection algorithms and/or protocols according to some embodiments of the invention may not label such local minima as anomalies—which may be, e.g., intuitively explained based on the fact that the depth and width of "wells" included in the graph and including the minima is consistent, and that similar wells are repeating along the graph. In contrast, a sharp peak in $t_2$ 920, around the 3rd month of June included in the graph may be inconsistent and may not repeat itself along the graph and measured data (and it can thus be suspected to reflect, e.g., measurement errors or defected data entries). Anomaly detection algorithms and/or protocols according to some embodiments of the invention may label or classify this peak as an anomaly in the input temperature data.

Figure 10:
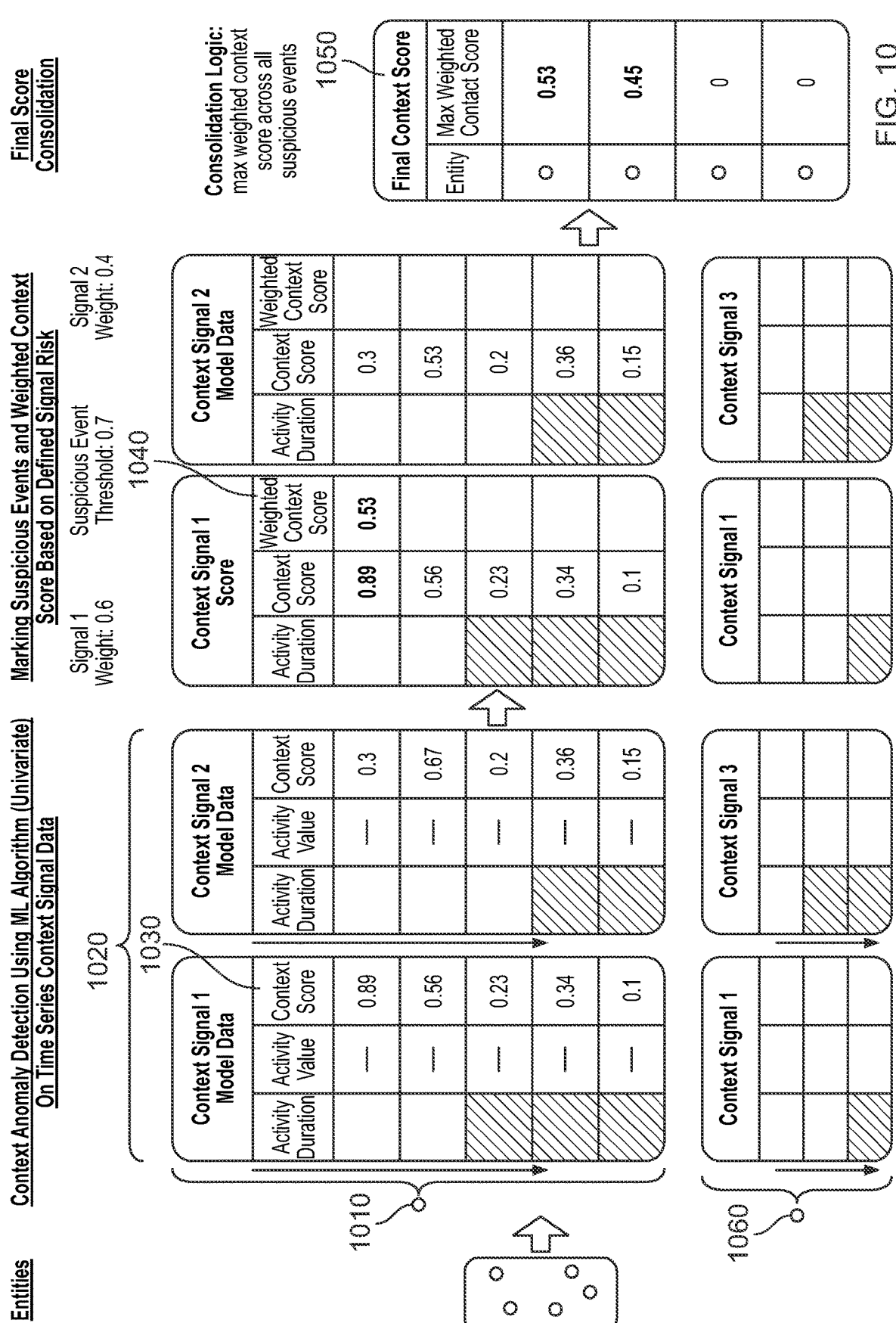
FIG. 10 shows an example context anomaly detection procedure according to some embodiments of the invention.

FIG. 10 shows an example context anomaly detection procedure according to some embodiments of the invention. For a single entity 1010 (which may be, e.g., one of a plurality of entities as illustrated in FIG. 10), some embodiments of the invention may consider input event data and/or a plurality of context signals 1020 (describing, e.g., an event or transaction of a given type associated with entity 1010, such as for example described herein). For example, events described in the input data may be assigned a context score 1030 (in the example depicted in FIG. 10, a context score may be calculated, e.g., or based on, the "activity value" attribute for each event or signal, and for example using an anomaly detection procedure such as, e.g., the iForest algorithm discussed herein). Some embodiments of the invention may further weigh the context scores for events or signals (which may be or may include anomaly scores for the events or signals associated with a single entity), such as for example using the weights provided in Eq. 1 and as discussed herein, to produce weighted context scores 1040. In some embodiments, events or context signals may be binarily classified as "suspicious" (e.g., "anomalous"), or as "normal" e.g., based on comparing context scores and/or weighted scores to a predetermined threshold (for example, some embodiments may classify events or signals for which scores above T=0.7 were calculated as "anomalous", and events or signals for which scores below T were calculated as "normal")—although different conditions or criteria for classification may be used in different embodiments. Embodiments may assign a final or consolidated context score or rank 1050 to entity or user 1010 by applying appropriate logical and/or quantitative conditions or criteria (which may be referred to as "consolidated logic"), which may be for example the maximum weighted context score calculated for input data items (e.g., signals and/or event data) associated with that entity. Other procedures and/or conditions or criteria used for calculating a final or consolidated context score may be used in different embodiments. Similar operations may be applied to event data and/or signals, e.g., as part of calculating a final or consolidated context score for additional, different entities such as for example entity 1060.

Figure 11:
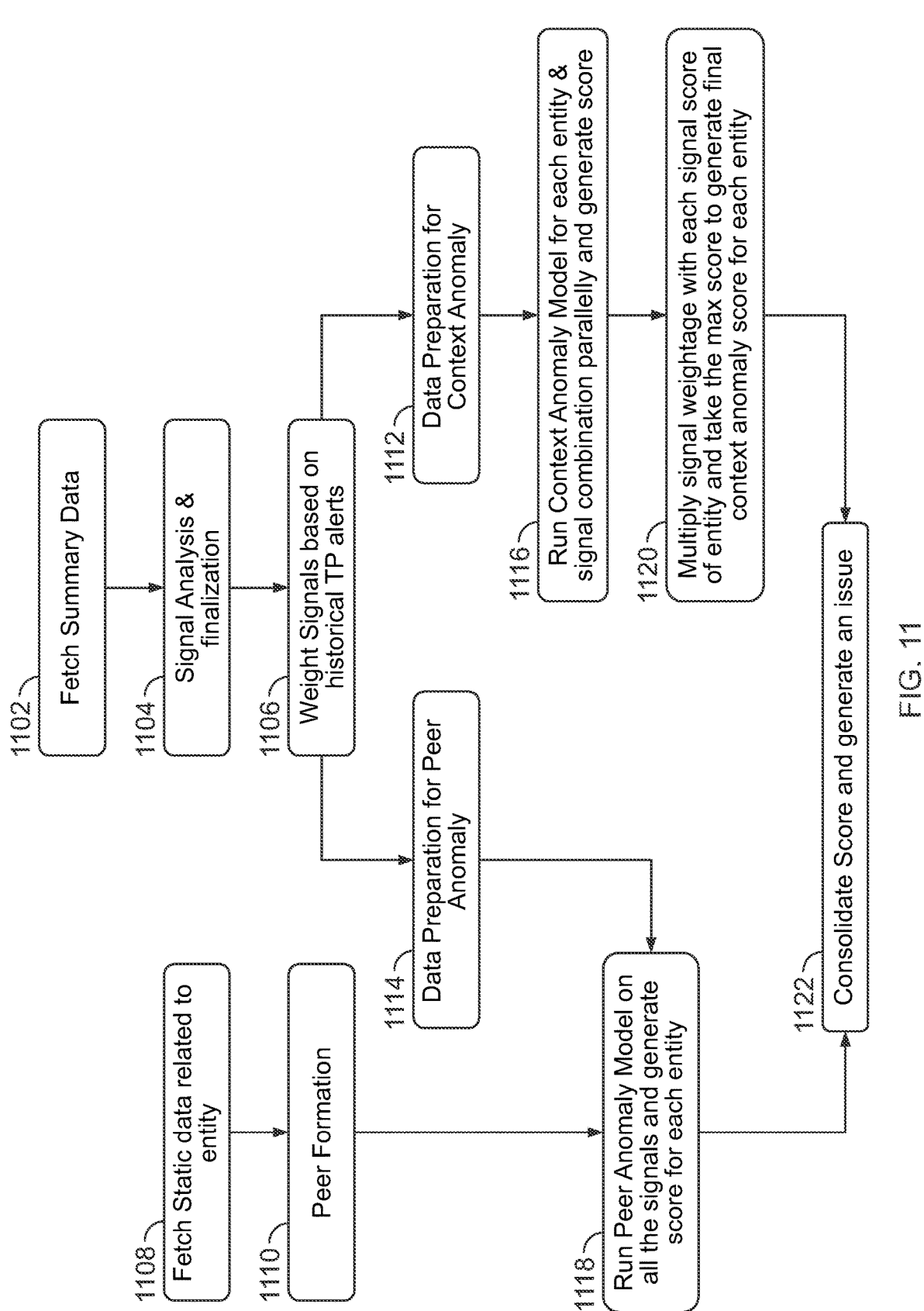
FIG. 11 shows an example anomaly detection process according to some embodiments of the invention.

FIG. 11 shows an example anomaly detection process according to some embodiments of the invention. Embodiments may begin the anomaly detection process by fetching and/or creating summary data or event data (e.g., from summary tables or equivalent data stores or repositories including transaction data, such as for example demonstrated herein with regard to the Athena service; step 1102). In some embodiments, fetched or retrieved data may include, e.g., transaction types and values, historical alert or notification data (such as for example the number of alerts previously generated or transmitted and associated with a particular transaction type) as well as a count or number of the data items or records describing these transactions. Additional or alternative fetched data or metadata of informations items or records may be used in different embodiments of the invention.

From event data or metadata, embodiments may assemble signals which may be used for detecting peer and context anomalies such as for example described herein (step 1104). Signals may be weighted for example based on historical alert or notification data such as for example described herein (step 1106), and signal weights may be saved or stored alongside the signals, e.g., in a dedicated database in system memory 120. In some embodiments of the invention, anomaly detection protocols and procedures (such as for example described throughout the present document) may be run or executed only on signals or signal types for which weights larger than a predetermined threshold T (such as, e.g., T=0.3) were calculated. Additional or alternative conditions or criteria for, e.g., what input data should be considered in anomaly detection protocols and procedures may be used in different embodiments of the invention.

Embodiments may fetch static entity, account, or party data (step 1108) to execute peer formation, clustering, or grouping (step 1110) such as, e.g., based on the data using the K-Mode algorithm as described herein. In some embodiments, steps 1102-1106 may be performed, e.g., in parallel to steps 1108-1110. Embodiments may then prepare the input data or signals for, e.g., subsequent anomaly detection protocols and procedures which may include, e.g., performing signal logic operations and associating signals with the relevant peer groups (e.g., in separate steps 1112 and 1114, which may be suitable for context and peer anomaly detection protocols, respectively).

In some embodiments, data preparation may be or may include, for example, fetching, gathering or selecting signals or past signals according to pre-set or predetermined conditions or criteria, such as, e.g., an predefined time period or overall timeframe assumed or required to have sufficient statistical significance or robustness (such as for example signals included in a timeframe of 6 months or 1 year, although other timeframe lengths may be used in different embodiments).

Embodiments may perform or execute context anomaly detection protocols (step 1116) and peer anomaly detection protocols (step 1118), e.g., which may include or involve organizing or sorting a plurality of signals in a plurality of separate and distinct decision trees, e.g., using the iForest algorithm such as for example described herein, e.g., separately and/or or in parallel, and generate, collect and/or store a plurality of anomaly scores calculated using these protocols.

In some embodiments, calculated or computed scores (which may, e.g., be calculated or generated as part of the iForest algorithm as discussed herein, and may for example range between −1 and 1 as described herein, although other score ranges may be used in different embodiments) may be further processed, weighted, or normalized, such as for example described herein. In one example, a maximal score among a plurality of context anomaly scores for a given entity may automatically be selected and be used as a context anomaly score for that entity, such as, e.g., described herein (step 1120). Embodiments may consolidate or unify scores or results for example to calculate a final or consolidated score based on weighting a plurality of anomaly scores (such as for example normalizing weighting a first peer anomaly score and a second context anomaly score, e.g., as demonstrated herein; step 1122), and, e.g., if the consolidated or final score or result is greater than, e.g., a threshold value, then a corresponding event or signal may be marked or labeled as anomalous, and an appropriate alert or notification may be generated based on the calculated score and/or transmitted by embodiments of the invention as described herein.

In some embodiments, calculated anomaly scores or ranks may be stored in a corresponding database, which may be, e.g., for example in table format, such as for the example data illustrated in Table 1:

TABLE 1

| MODEL_PEER_SCORE | MODEL_CONTEXT_SCORE | NORMALIZED (FINAL)_SCORE |
|---|---|---|
| −1 | −0.9 | 100 |
| −0.75 | −0.51 | 90 |
| −0.5 | −0.01 | 80 |
| 0 | −0.09 | 70 |
| 0.25 | −0.09 | 60 |
| 0.5 | −0.09 | 50 |
| 0.75 | −0.09 | 40 |
| 1 | −0.09 | 30 |

Additional or alternative database forms or formats may be used in different embodiments.

Figure 12:
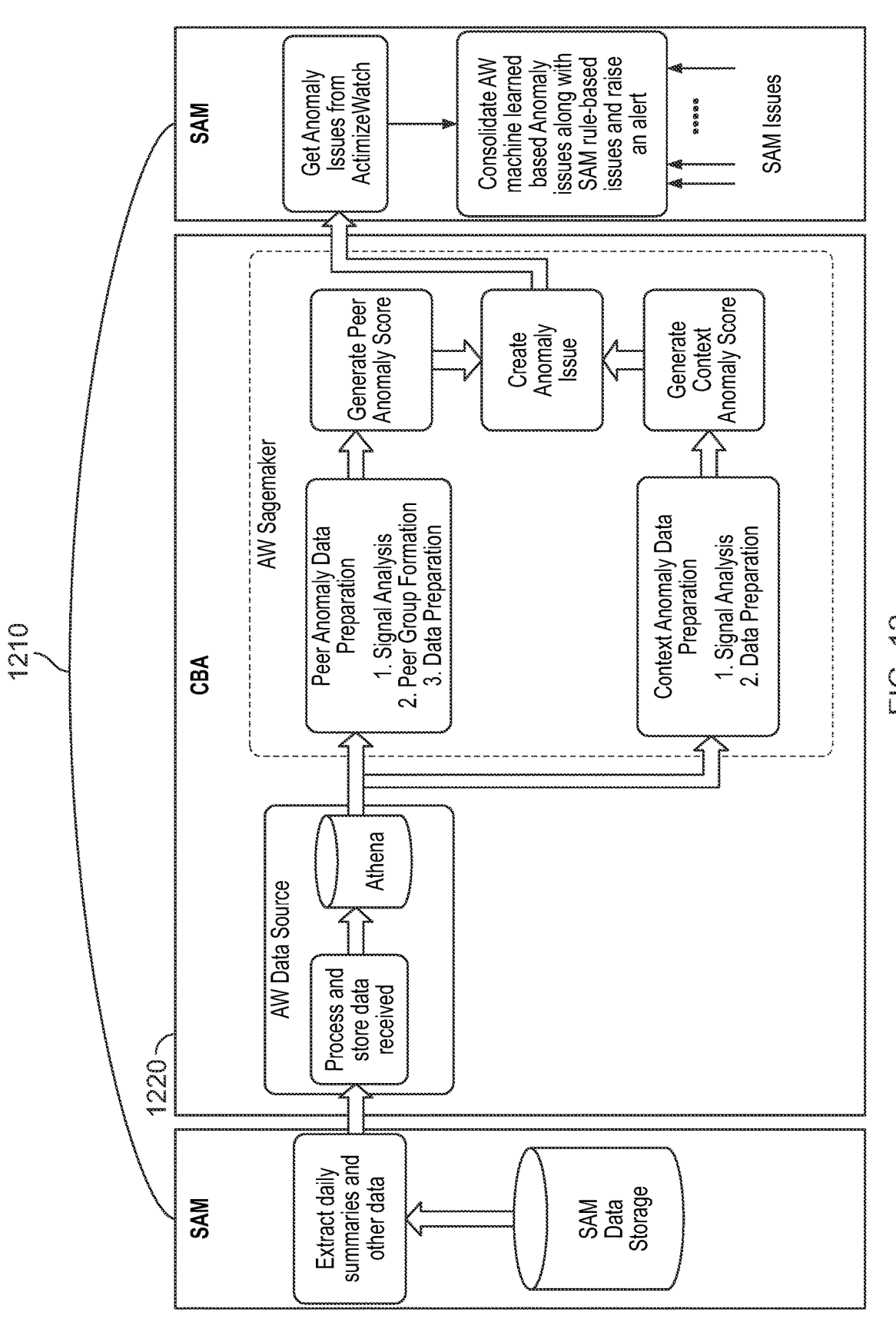
FIG. 12 shows an example architecture of an anomaly detection system according to some embodiments of the invention.
Figure 13A:
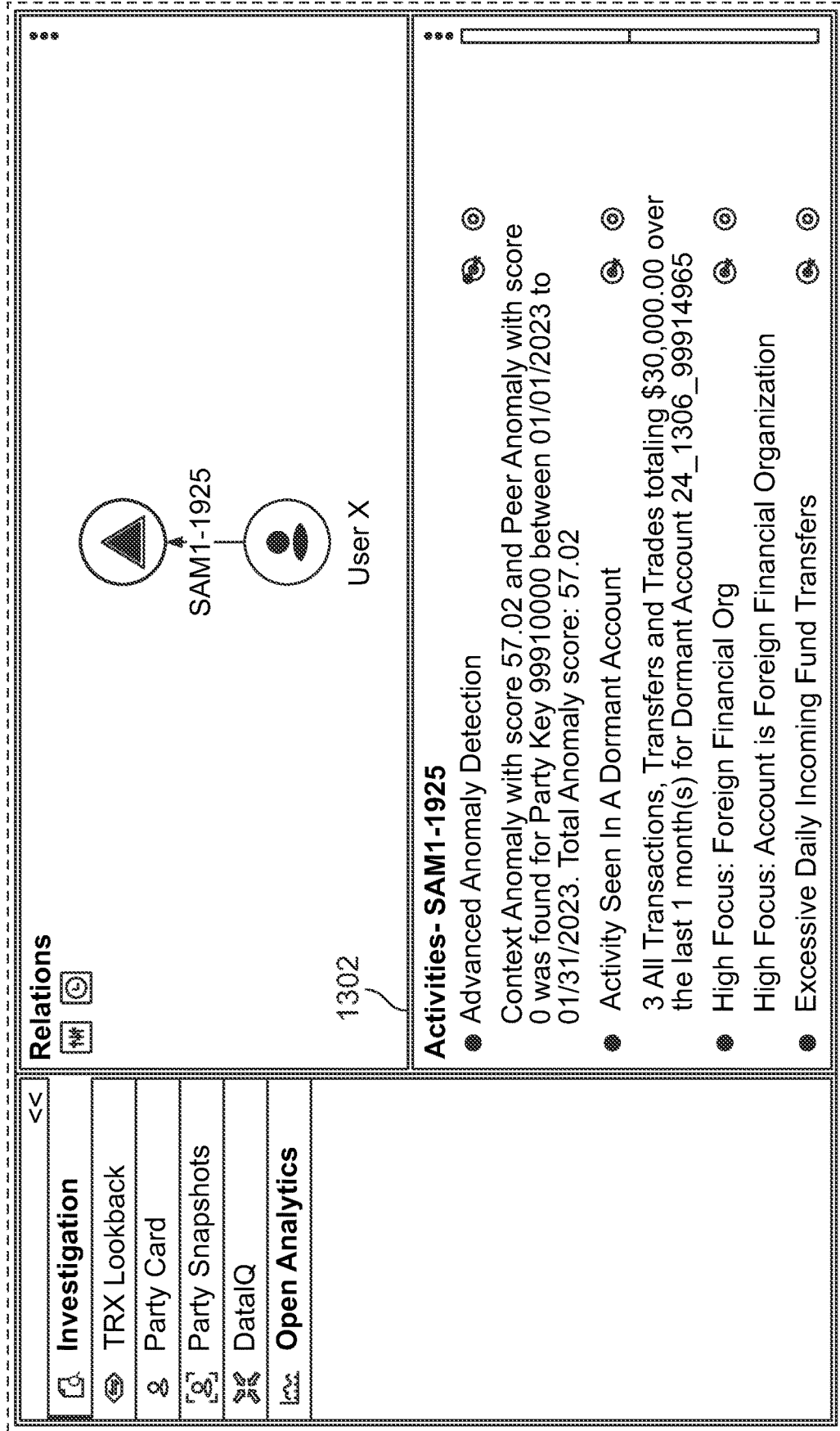
Figure 13B:
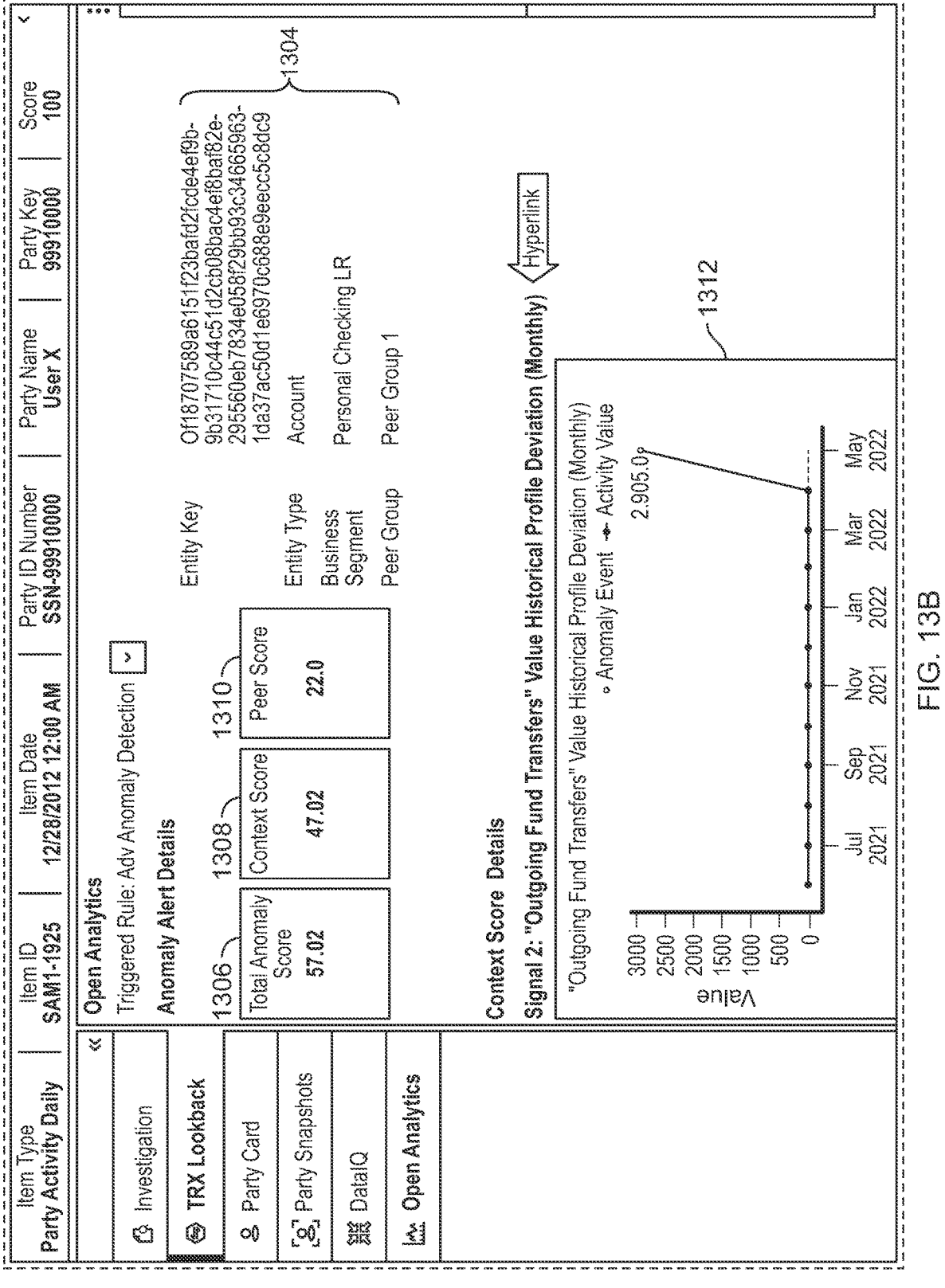
Figure 13C:
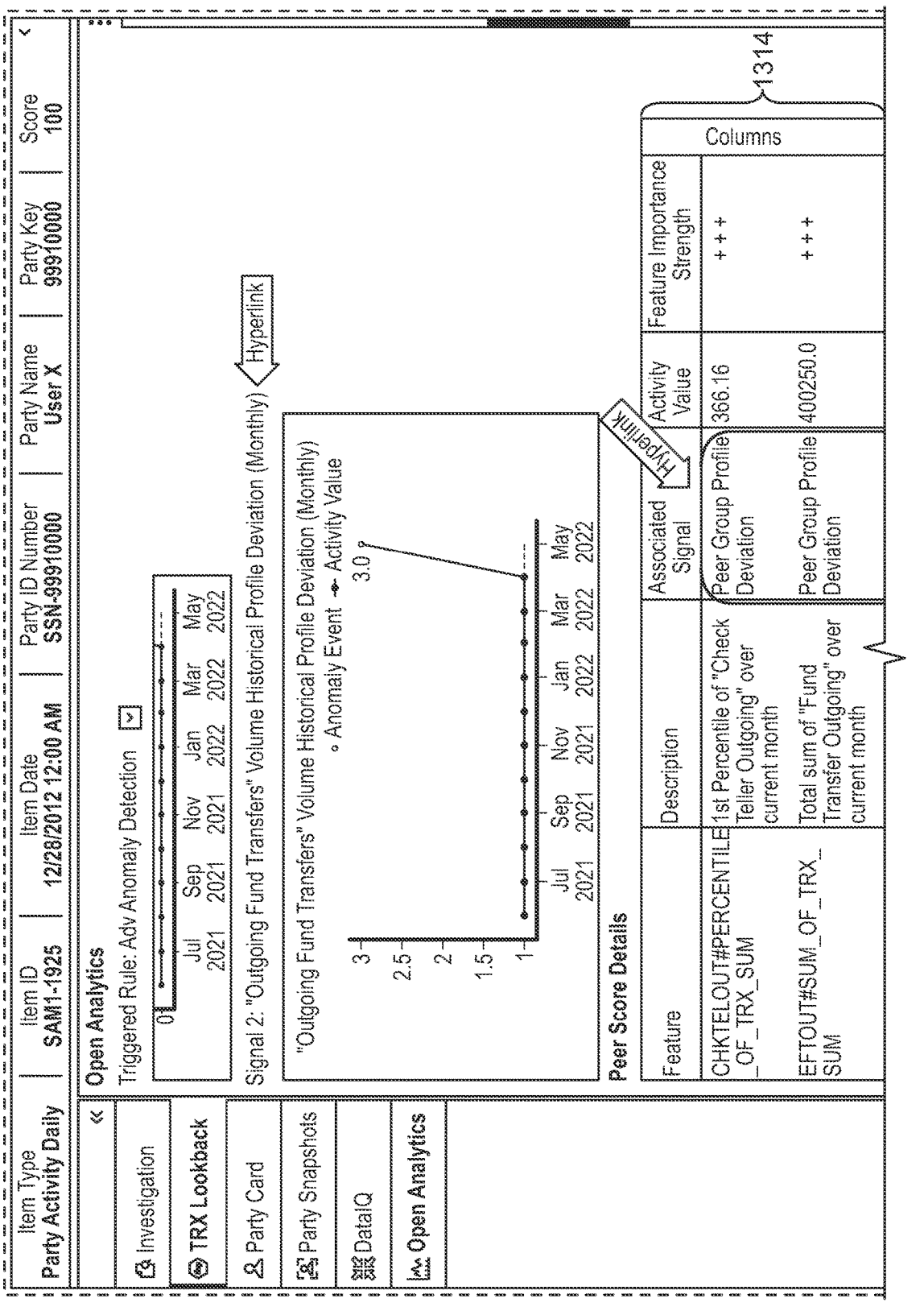

FIG. 12 shows an example architecture of an anomaly detection system according to some embodiments of the invention. Some embodiments may be implemented in, e.g., existing security products and services, such as for example Suspicious Activity Monitoring (SAM) platform by Actimize LTD 1210, and the Actimize Watch cloud-based analytics (CBA) platform by Actimize LTD 1220, although additional or alternative platforms and/or infrastructure (including, for example Amazon Web (AW) services and components such as the AW Sagemaker service or AW Data services) may be used in different embodiments of the invention. Embodiments may retrieve input data such as for example event and/or entity data from a data store—which may be for example be included in the Athena service as described herein and integrated into, or included as, part of the SAM service or platform 1210. Example embodiments of the invention may thus use or consume input data from the SAM service, perform various anomaly detection operations using the CBA platform 1220, and provide anomaly detection scores or outputs back to the SAM service 1210 (illustrated in FIG. 12 as including two components connected by an arc), which may further process anomaly detection results and generate or raise alerts or notifications such as, e.g., described herein.

In some embodiments SAM service 1210 may initiate an anomaly detection process by sending a monthly/daily summary of, e.g., event and/or entity data. Embodiments may store summary data in it in a table such as for the example data in Table 2, which may, e.g., be used for creating signal data and/or include additional event summary information, and/or various sources of information such as for example the various quantities and values relating to event or signal data as described herein.

TABLE 2

Example Tables Used for Signal Construction xdtsam_prf_tgv_xdt_sam_agg_monthly_summary
(may contain or refer to summary details of
monthly transactions done by the entity or party)
xdtcdsv_inc_party_account_relation (may contain
or refer to details of a relationship between an
entity or party and an account used for
transactions)
xdtcdsv_sam_trans_type (may contain or refer to
details of summary of transaction types performed
by the entity or party)
xdtsam_prf_tgv_xdt_sam_agg_daily_summary
(may contain or refer to details of summary of daily
transactions performed by the entity or party)
xdtcdsv_inc_party (may contain or refer to details
describing or associated with the entity or party)

Different database and/or table formats may be used in different embodiments.

CBA 1220 may receive input data from SAM service 1210, construct or generate signals such as, e.g., described herein. For example, embodiments may search or query the data store or database containing input data such as, e.g., provided in Table 2, and for example construct or generate signals including, e.g., event statistics (based for example on signal logic) such as for example described herein. Embodiments may then perform data preparation for, and/or execute the iForest model as part of, e.g., two distinct peer and context anomaly detection processes or protocols such as e.g. described herein. CBA 1220 may further normalize and/or consolidate anomaly scores such as for example described herein. SAM 1210 may then collect the output, responses, or results from CBA 1220, and if, e.g., anomaly detection scores exceed a predetermined threshold then, e.g., SAM 1210 may generate or raise an alert based on calculated anomaly scores, and display the alert, e.g., on an appropriate user interface (UI) such as for example demonstrated herein. In some embodiments, result or score normalization and/or consolidation may be the last or final step of anomaly detection protocols and may be performed by SAM 1210. Additional or alternative implementations and/or workflows may be considered in different embodiments of the invention.

FIGS. 13A-D show an example visualization of anomaly detection results according to some embodiments of the invention. Embodiments may be implemented into or integrated with an analytics platform such as for example AW, although different platforms may be used in different embodiments. Some embodiments of the invention may, for example present or display suspicious event detection (as executed, e.g., using the SAM service mentioned herein) or anomaly detection related events or activities 1302, e.g., in chronological order. Embodiments may display various entity features or attributes 1304 for a given entity, in addition to a plurality of corresponding, anomaly related scores describing that entity, such as for example peer anomaly score 1306, context anomaly score 1308, and a total anomaly score 1310 (which may be for example a final or consolidated anomaly score) calculated, e.g., according to the various protocols and procedures discussed herein. Embodiments may display an anomalous event, such as for example an event for which anomaly scores exceed a predetermined threshold as described herein, on a graph 1312—which may, e.g., compare the anomalous property of value associated with the event under consideration with reference events, e.g., which may be included in peer and/or context data and/or signals considered as part of the anomaly detection procedures such as e.g. described herein. Embodiments may present or display information used in calculating anomaly scores such as context anomaly scores and peer anomaly scores 1314, as well as signal details and/or features or attributes 1316A-B. e.g., for the plurality of signals used in corresponding anomaly detection procedures—on an output computer display using for example a UI as demonstrated herein. Additional or alternative contents and/or data or information items may be displayed and/or visualized in different embodiments of the invention.

Figure 14:
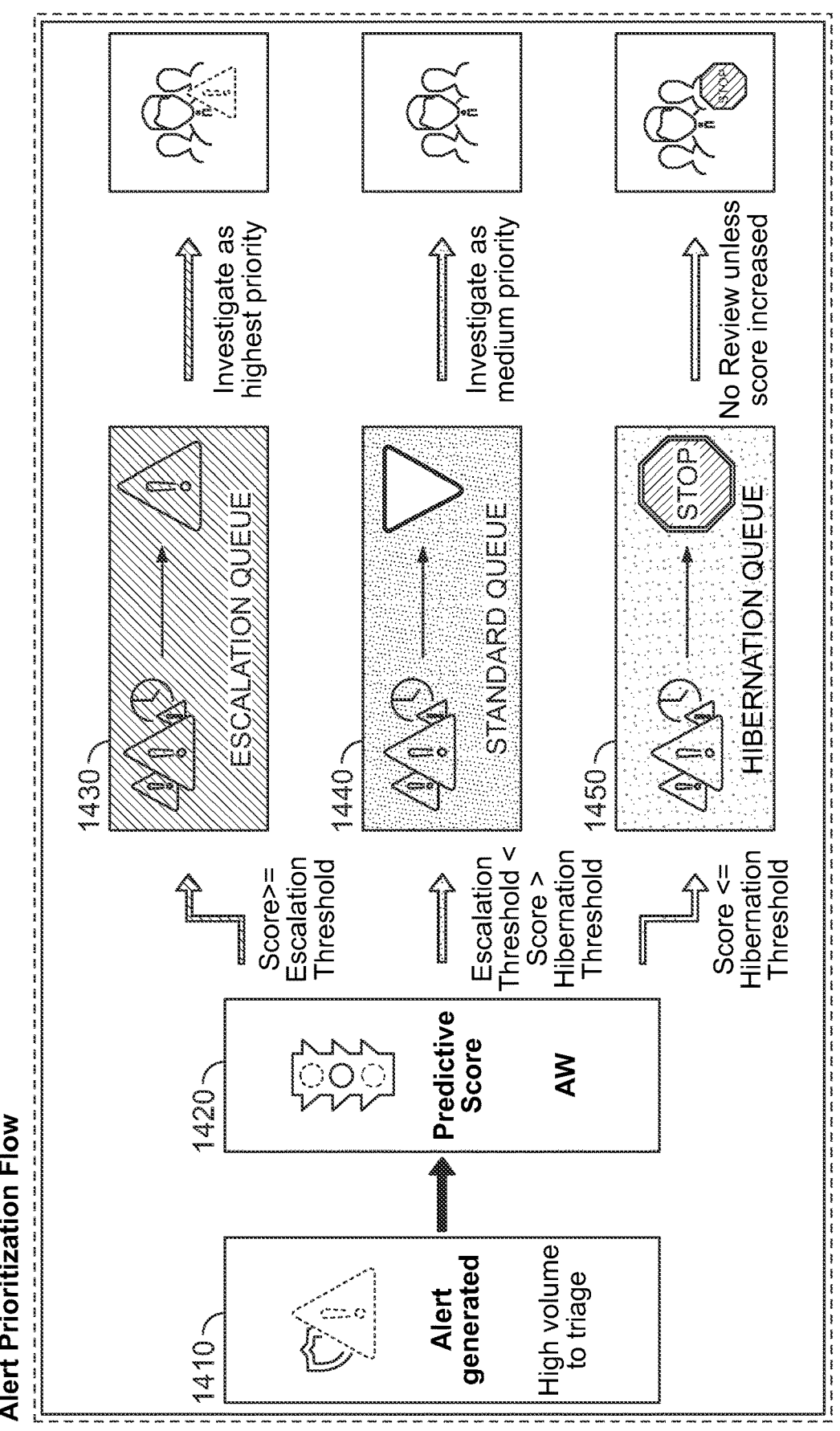
FIG. 14 describes an example alert prioritization workflow according to some embodiments of the invention.

FIG. 14 describes an example alert prioritization workflow according to some embodiments of the invention. Following the generation of an alert or notification 1410 based on anomaly detection protocols and procedures such as for example described herein (e.g., based on calculated anomaly scores and appropriate anomaly threshold values), embodiments may calculate a predictive score for the alert generated 1420. In this context, embodiments may use, e.g., a predictive alert scoring program or service such as for example the SAM Predictive Scoring service as provided in the SAM platform mentioned herein, although additional or alternative predictive alert scoring schemes, operations and/or services may be used in different embodiments of the invention. Embodiments may assign the alert to a priority queue based on the calculated predictive score. For example, if a predictive score calculated for a given alert exceeds an escalation threshold $T_e$ (e.g., $T_e=0.8$), the alert may be assigned to an escalation queue 1430, which may a high priority alert queue requiring urgent or immediate intervention from a human user or supervisor. If the score is lower than the escalation threshold but is higher than a hibernation threshold $T_h$ (e.g., $T_h=0.3$), the alert may be assigned to a standard queue 1440, which may require less urgent intervention or investigation by a human user (e.g., within a few days). If the score is lower than the hibernation threshold $T_h$—the alert may be assigned to a hibernation queue 1450, which may not require further intervention or investigation at all. In some embodiments of the invention, however, hibernation queue 1450 but may be used to store alerts such that, e.g., if a predefined number N of alerts describing events of the same type are generated and stored in the hibernation queue, such as for example N=15, then a cumulative alert describing all 15 "hibernated" alerts may be, for example, automatically generated by some embodiments of the invention and be assigned to a higher priority alert queue (such as for example standard queue 1440 or escalation queue 1430). Additional or alternative alert prioritization and management rules and/or conditions or criteria may be used in different embodiments of the invention.

Alerts or notifications automatically generated and/or transmitted by embodiments of the invention may conform to different formats—which may include, for example, text in corresponding files (such as, e.g., JSON format, CSV format, and the like) describing the anomaly, although additional or alternative alert contents and formats may be used in different embodiments. Embodiments may transmit alerts, e.g., to physically separate and/or remote computer systems (such as for example ones operated by a supervisor or a party associated with an entity for which anomalies may be detected) using various communication and/or network protocols known in the art—and notifications or alerts sent or transmitted using different embodiments of the invention may be displayed or presented on an output computer display of such remote computer using a UI such as, e.g., demonstrated herein.

Based on anomaly detection protocols and procedures and/or scores or ranks such as, e.g., discussed herein—some embodiments of the invention may automatically perform, decline, or reverse data transfers between a plurality of physically separate computer systems over a communication network. In the nonlimiting example relating to financial transactions, an event such as, e.g., a pending credit card transaction described using a corresponding event data items or signal which was found anomalous by embodiments of the invention may automatically be declined if an anomaly score calculated for the transaction is higher than a predetermined threshold (such as, e.g., T=$10K). Similarly, an already performed transaction having an anomaly score above such predetermined threshold may automatically be reversed—for example by automatically sending an appropriate reversal request or command to the parties or entities considered. One skilled in the art may recognize that many more example automatic operations-relating, e.g., to data transfers over a communication network which may be unrelated to finance or to financial transactions—may be performed based on anomaly scores and/or procedures or protocols such as for example considered herein by different embodiments of the invention.

Previous systems and methods for anomaly detection are often rule based. For example, some systems used by financial institutions often focus, for example, on tagging and identifying transaction types and/or attributes corresponding to known or previously identified money laundering typologies, which might result in coverage gaps (relating, e.g., to "unknown unknowns", or to anomalies to which no precedence exists). Thus, previous systems and methods often lack the ability to detect outliers or anomalous activity associated with changing or evolving data typologies. Embodiments of the invention may improve technologies of anomaly detection by offering a robust technological framework for detecting outliers without depending merely, e.g., on predefined rules explicitly anomalous patterns, or on tuning parameters within such rules—which may prove difficult and time consuming. When large volumes of high dimensional data are considered, it may also prove difficult to formulate strict rules that anticipate or capture all possible types of anomalies which may be of interest. Embodiments may provide an automated, machine learning based approach and an advanced feature construction as described herein, which may reduce computational times and be easily scalable to large, high dimensional datasets—while not requiring further manual tuning or intervention from a human user for detecting various types of anomalies and/or outliers.

Figure 15:
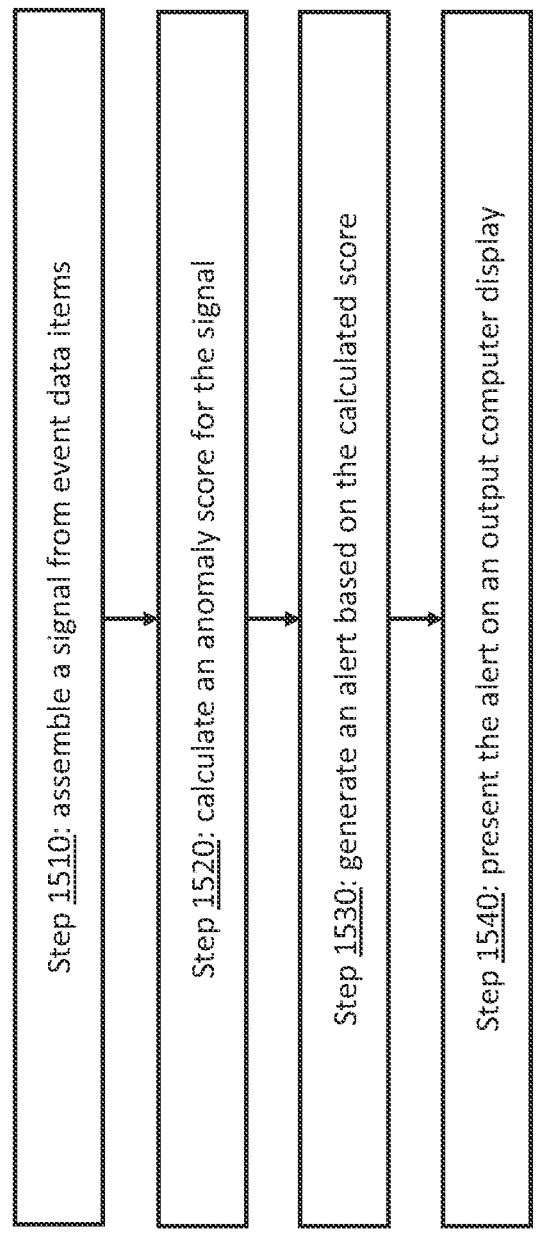
FIG. 15 is a flowchart depicting an example method for anomaly detection according to some embodiments of the invention.

FIG. 15 is a flowchart depicting an example method for anomaly detection according to some embodiments of the invention. In step 1510, embodiments of the invention may assemble a signal from, or based on, event data items (such as for example demonstrated herein using queries on an Athena database). Embodiments may calculate an anomaly score for the signal, for example using the peer and/or context anomaly detection procedures and/or score weighting or consolidation such as, e.g., described herein (step 1520). Embodiments may generate an alert based on the calculated anomaly score (step 1530) and present the alert on an output computer display (step 1540). Additional or alternative operations may be included in different anomaly detection procedures according to different embodiments of the invention.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:
1. A method of detecting anomalies, the method comprising, using a computer processor:

assembling, by the processor, a signal based on one or more event data items;

determining, by the processor, a first anomaly score by automatically organizing, via a first machine learning model, one or more of the past signals in a decision tree, wherein the anomaly score is calculated based on the organization, and wherein the first machine learning model is an unsupervised machine learning model;

determining, by the processor, a second anomaly score by clustering, via a second machine learning model, a plurality of entities into one or more groups based on one or more event data items, and determining, by the processor, a final anomaly score by consolidating the first anomaly score and the second anomaly score;

generating, by the processor, an alert based on the final anomaly score; and presenting, by the processor, the alert on an output computer display.

2. The method of claim 1, wherein the assembling of a signal comprises:

associating, by the processor, the signal to one or more event types, wherein one or more of the event data items are selected based on one or more of the event types; and determining, by the processor, a timeframe for the signal based on one or more of the event data items.

3. The method of claim 2, wherein the event types describe at least one of: a class of financial transactions, and a transaction value.

4. The method of claim 1, wherein the calculating of a final anomaly score comprises weighting, by the processor, one or more of the past signals, the weighting based on one or more past alerts generated for one or more of the past signals.

5. The method of claim 1, wherein each of the one or more event data items describes a data transfer between one or more physically separate computer systems, the transfer performed over a communication network.

6. The method of claim 1, wherein the clustering of entities into groups comprises measuring similarity between one or more of the entities, the measuring based on one or more entity profile attributes, wherein the one or more profile attributes match for one or more of the entities.

7. The method of claim 1 wherein the first anomaly score and the second anomaly score are weighted.

8. A computerized system for detecting anomalies, the system comprising:

a memory, and a computer processor configured to:

assemble a signal based on one or more event data items;

determine a first anomaly score by automatically organizing, via a first machine learning model, one or more of the past signals in a decision tree, wherein the anomaly score is calculated based on the organization, and wherein the first machine learning model is an unsupervised machine learning model;

determine a second anomaly score by clustering, via a second machine learning model, a plurality of entities into one or more groups based on one or more entity data items, and determine a final anomaly score by consolidating the first anomaly score and the second anomaly score;

generate an alert based on the final anomaly calculated score; and present the alert on an output computer display.

9. The system of claim 8, wherein the assembling of a signal comprises:

associating the signal to one or more event types, wherein one or more of the event data items are selected based on one or more of the event types; and determining a timeframe for the signal based on one or more of the event data items.

10. The system of claim 9, wherein the event types describe at least one of: a class of financial transactions, and a transaction value.

11. The system of claim 8, wherein the calculating of a final anomaly score comprises weighting one or more of the past signals, the weighting based on one or more past alerts generated for one or more of the past signals.

12. The system of claim 8, wherein each of the one or more event data items describes a data transfer between one or more physically separate computer systems, the transfer performed over a communication network.

13. The system of claim 8, wherein the clustering of entities into groups comprises measuring similarity between one or more of the entities, the measuring based on one or more entity profile attributes, wherein the one or more profile attributes match for one or more of the entities.

14. A method of machine learning based anomaly detection, the method comprising, using a computer processor:

creating, by the processor, a signal based on one or more event data items;

fetching a plurality of past signals based on a predefined time period;

automatically sorting, by a first machine learning model, one or more of the past signals in a first decision tree;

computing, by the processor, a first anomaly rank for the signal based on the first decision tree;

automatically sorting, by a second machine learning model, one or more of the past signals in a second decision tree;

computing, by the processor, a second anomaly rank for the signal based on the second decision tree;

calculating, by the processor, a final anomaly rank, the calculating of a final anomaly rank comprising weighting the first anomaly rank and the second anomaly rank;

generating, by the processor, a notification based on the calculated final anomaly rank; and displaying, by the processor, the notification on a user interface (UI);

wherein the sorting of signals in a first decision tree and the sorting of signals in a second decision tree are performed in parallel.

15. The method of claim 14, wherein the anomaly ranks compare the signal to one or more past signals;

wherein the signal is associated with a first entity;

wherein the first anomaly rank describes one or more of the past signals associated with the first entity; and wherein the second anomaly rank describes one or more of the past signals associated with a cluster of entities, the cluster including the first entity.

16. The method of claim 15, wherein the computing of a first anomaly rank comprises weighting, by the processor, one or more of the past signals, the weighting based on one or more past notifications generated for one or more of the past signals.

17. The method of claim 14, comprising automatically reversing, by the processor, a data transfer between one or more physically separate computer systems based on the final anomaly rank, the transfer performed over a communication network.

* * * * *